US 11,630,570 B2

(12) United States Patent
Kumami et al.

(10) Patent No.: US 11,630,570 B2
(45) Date of Patent: Apr. 18, 2023

(54) SPATIAL POSITION INDICATION SYSTEM

(71) Applicant: Wacom Co., Ltd., Saitama (JP)

(72) Inventors: Hajime Kumami, Saitama (JP); Koji Yoshida, Saitama (JP); Hiroshi Tamano, Saitama (JP); Hiroshi Munakata, Saitama (JP); Yuanhao Chen, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/809,334

(22) Filed: Mar. 4, 2020

(65) Prior Publication Data

US 2020/0201542 A1 Jun. 25, 2020

Related U.S. Application Data

(63) Continuation of application No. PCT/JP2018/008894, filed on Mar. 8, 2018.

(30) Foreign Application Priority Data

Sep. 4, 2017 (JP) .............................. JP2017-169679

(51) Int. Cl.
*G06F 3/0488* (2022.01)
*G06F 3/0354* (2013.01)
(Continued)

(52) U.S. Cl.
CPC .......... *G06F 3/04883* (2013.01); *G06F 3/011* (2013.01); *G06F 3/014* (2013.01);
(Continued)

(58) Field of Classification Search
CPC .. G06F 3/04883; G06F 3/03545; G06F 3/011; G06F 3/014; G06F 3/016;
(Continued)

(56) References Cited

U.S. PATENT DOCUMENTS 9,323,379 B2   4/2016   Aubauer et al.
9,367,169 B2   6/2016   Tan
                (Continued)

FOREIGN PATENT DOCUMENTS

JP   2004-280205 A     10/2004
JP   2004280205 A  *  10/2004
                (Continued)

OTHER PUBLICATIONS

International Search Report and Written Opinion, dated Apr. 17, 2018, for International Application No. PCT/JP2018/008894, 11 pages. (w/ English machine translation of International Search Report).

(Continued)

*Primary Examiner* — Amare Mengistu
*Assistant Examiner* — Jennifer L Zubajlo
(74) *Attorney, Agent, or Firm* — Seed IP Law Group LLP

(57) ABSTRACT

A spatial position indication system includes an electronic pen, an indicated position detecting circuit, a spatial position detecting circuit, and a selecting circuit. The indicated position detecting circuit detects a position of the electronic pen at an input surface or a hover region over the input surface. The spatial position detecting circuit detects the position of the electronic pen in a spatial region including at least a part of the hover region separately from and independently of the indicated position detecting device circuit. Based on output from the indicated position detecting circuit and the spatial position detecting circuit, the selecting circuit performs selection control so as to use output from the indicated position detecting circuit or the spatial position detecting circuit according to a separation distance of the electronic pen from the input surface when a drawing image to be displayed on a display device is generated.

28 Claims, 11 Drawing Sheets

(51) Int. Cl.
  *G06F 3/04883* (2022.01)
  *G06F 3/01* (2006.01)
  *G06F 3/041* (2006.01)
  *G06F 3/0346* (2013.01)
  *G06F 3/046* (2006.01)
  *G06F 3/042* (2006.01)

(52) U.S. Cl.
  CPC .............. *G06F 3/016* (2013.01); *G06F 3/017* (2013.01); *G06F 3/0346* (2013.01); *G06F 3/03545* (2013.01); *G06F 3/046* (2013.01); *G06F 3/0416* (2013.01); *G06F 3/0425* (2013.01); *G06F 2203/04101* (2013.01); *G06F 2203/04106* (2013.01)

(58) Field of Classification Search
  CPC ...... G06F 3/017; G06F 3/0346; G06F 3/0416; G06F 3/0425; G06F 3/046; G06F 2203/04101; G06F 2203/04106
  See application file for complete search history.

(56) References Cited

U.S. PATENT DOCUMENTS

| | | | | |
|---|---|---|---|---|
| 2013/0241832 A1* | 9/2013 | Rimon | ................ | G06F 3/03545 345/158 |
| 2014/0055396 A1* | 2/2014 | Aubauer | ................ | G06F 3/017 345/173 |
| 2014/0240248 A1* | 8/2014 | Han | ................ | G06F 3/04166 345/173 |
| 2015/0301633 A1* | 10/2015 | Nakamura | ............ | G06F 3/0416 345/173 |
| 2016/0154477 A1* | 6/2016 | Nishida | ................ | G06F 3/0418 345/157 |
| 2016/0306489 A1* | 10/2016 | Mizuhashi | .......... | G06F 3/04166 |
| 2016/0349864 A1* | 12/2016 | Avanzi | .................... | G06F 3/017 |
| 2017/0206673 A1* | 7/2017 | Kawamoto | ............... | G06T 7/70 |

FOREIGN PATENT DOCUMENTS

| | | | |
|---|---|---|---|
| JP | 2008-129907 A | | 6/2008 |
| JP | 2008129907 A | * | 6/2008 |
| JP | 2010-26565 A | | 2/2010 |
| JP | 2010026565 A | * | 2/2010 |
| JP | 2014-164755 A | | 9/2014 |
| JP | 2016-48153 A | | 4/2016 |
| JP | 2016048153 A | * | 4/2016 |
| JP | 2016-206791 A | | 12/2016 |
| WO | 2016/185838 | | 11/2016 |
| WO | WO-2016185838 A1 | * | 11/2016 |

OTHER PUBLICATIONS

Extended European Search Report, dated Sep. 29, 2020, for European Application No. 18851507.6, 9 pages.
Japanese Office Action, dated Jan. 5, 2022, for Japanese Application No. 2018-132770 (with English translation). (7 pages).
Japanese Notice of Reasons for Rejection, dated Jun. 22, 2022, for Japanese Application No. 2018-132770, 8 pages (with English-language translation).

* cited by examiner

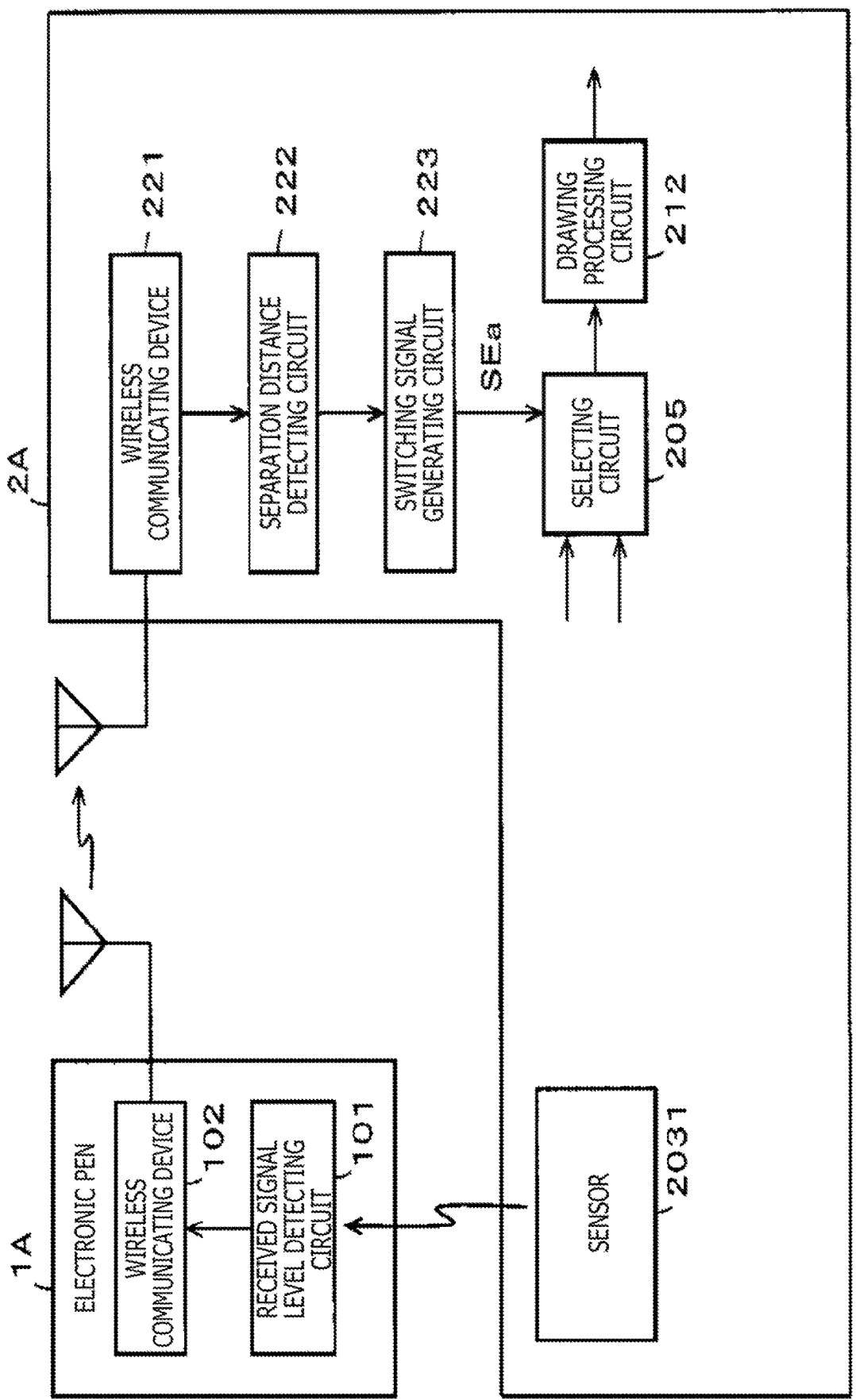

SPATIAL POSITION INDICATION SYSTEM

TECHNICAL FIELD

The present disclosure relates to a spatial position indication system suitable for a case where an electronic pen is used in a space.

BACKGROUND ART

A drawing system is known in which an animation image or the like is generated by performing drawing on a coordinate input device referred to as a digitizer through continuous position indication by an electronic pen. In this case, an operator performs a position indicating operation for generating a drawing image in a state in which the electronic pen is in contact with the input surface of a tablet device incorporating the digitizer or in a state in which the electronic pen is not in contact with the input surface of the tablet device but is positioned in an upward region in which position detection is possible (hovering state). The digitizer detects a position indicated by the electronic pen, generates a drawing image as a result of the detection, and displays the drawing image on a display screen. The operator performs drawing while checking the drawing image displayed on the display screen.

Systems and applications have recently emerged which are capable of drawing representation (for example rotation, deformation, or the like) of a drawing image displayed on a two-dimensional display screen such that the drawing image is visually a three-dimensional image. In this case, movement (gesture) of, for example, a hand or a finger of the operator is detected by using a movement sensor, and drawing representation processing is performed based on the detected movement (gesture).

Conventionally, a process of generating a two-dimensional drawing image based on detections of the positions indicated by the electronic pen by the digitizer and a process of drawing representation and handling of the two-dimensional image such that the two-dimensional image is a three-dimensional image are performed as separate processes independently of each other.

A user interface enabling both of position indication input as described above and operating input such as a gesture or the like has been provided (see Patent Document 1 and Patent Document 2, for example).

Patent Document 1 discloses a touch controller configured to switch from a hover event detection mode to a gesture event detection mode in response to a signal from a motion sensor.

In addition, Patent Document 2 discloses controller means for alternately determining positional information detected via a touch sensor type display and positional information detected via noncontact detecting means.

PRIOR ART DOCUMENT

Patent Documents

Patent Document 1: U.S. Pat. No. 9,367,169
Patent Document 2: U.S. Pat. No. 9,323,379

BRIEF SUMMARY

Technical Problem

However, the method of switching in response to the signal from the motion sensor as in Patent Document 1 requires the inclination of a device to be changed as needed for the switching.

In addition, in the case of Patent Document 2, switching between the touch sensor type display and the noncontact detecting means is performed on a time-division basis, and temporal resolution of each is decreased.

It is an object of the present disclosure to provide a spatial position indication system that can solve the above problems.

Technical Solution

In order to solve the above problems, there is provided a spatial position indication system including:

an indicated position detecting circuit which, in operation, detects a first position of an electronic pen at one or more of an input surface for receiving instruction input by the electronic pen and a hover region over the input surface;

a spatial position detecting circuit which, in operation, detects a second position of the electronic pen in a spatial region including at least a part of the hover region; and a selecting circuit which, in operation, selects whether to use the first position as an instruction input or use the second position as the instruction input according to a separation distance of the electronic pen from the input surface.

In the spatial position indication system having the above-described configuration, a detection region for the instruction input by the electronic pen in the indicated position detecting circuit is a region including the hover region over the input surface for receiving the instruction input by the electronic pen. The spatial position detecting circuit is configured to be able to detect the position of the electronic pen in the spatial region including at least a part of the above-described hover region of the indicated position detecting device.

The selecting circuit performs selection control so as to use output from the indicated position detecting device circuit or output from the spatial position detecting circuit according to the separation distance of the electronic pen from the input surface of the indicated position detecting device. An operator of the electronic pen can thereby perform operations while seamlessly switching between the indicated position detecting circuit and the spatial position detecting circuit by merely changing the separation distance of the electronic pen from the input surface.

BRIEF DESCRIPTION OF THE DRAWINGS

FIG. 7 is a diagram of assistance in explaining a modification of the first embodiment of the spatial position indication system according to the present disclosure.

MODES FOR CARRYING OUT THE DISCLOSURE

Embodiments of a spatial position indication system according to the present disclosure will hereinafter be described with reference to the drawings.

First Embodiment

Figure 1:
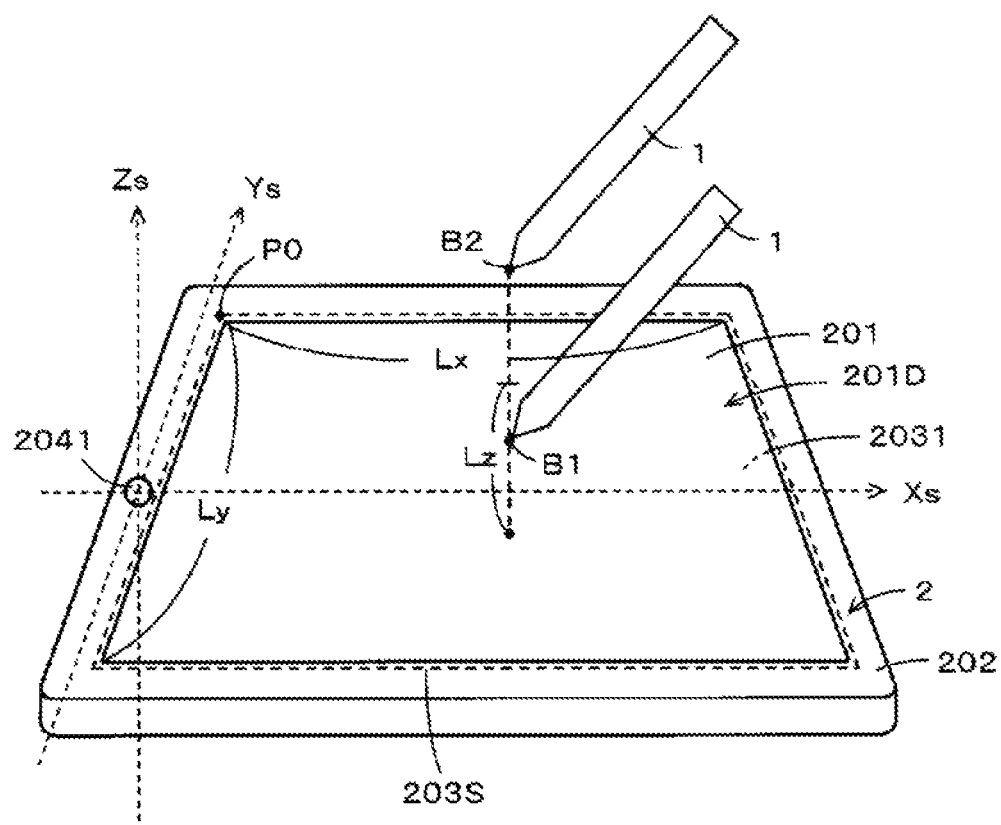
FIG. 1 is a diagram of assistance in explaining an outline of a first embodiment of a spatial position indication system according to the present disclosure.
Figure 2:
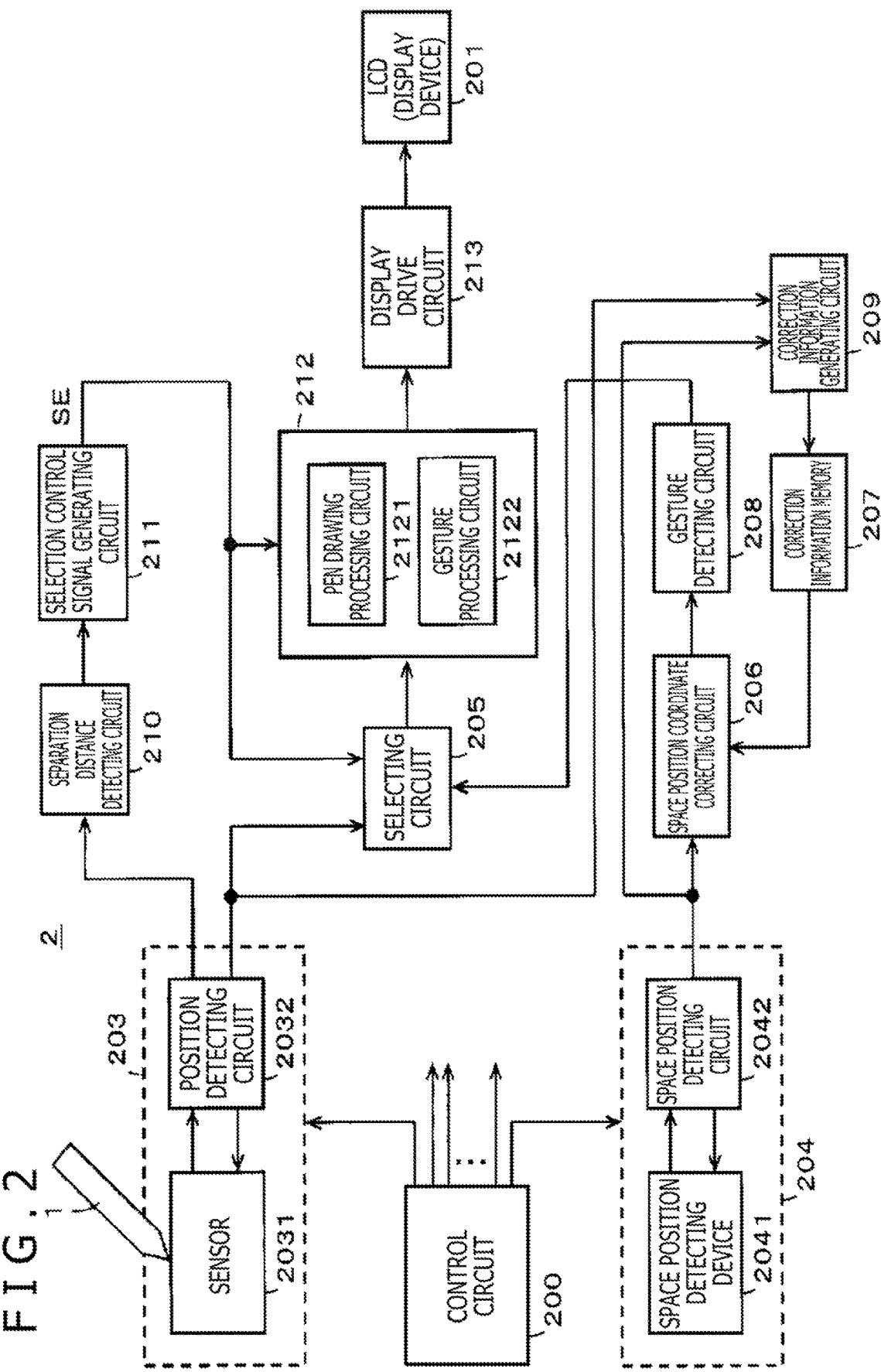
FIG. 2 is a block diagram of assistance in explaining an example of a configuration of the first embodiment of the spatial position indication system according to the present disclosure.

FIG. 1 is a diagram illustrating an example of a general configuration of a first embodiment of a spatial position indication system according to the present disclosure. As illustrated in FIG. 1, the spatial position indication system according to the present first embodiment includes an electronic pen 1 and a tablet device 2. The tablet device 2 in the present embodiment has an internal configuration as illustrated in FIG. 2. Schematically, a position indicated by the electronic pen 1, the position being detected by an indicated position detecting device 203, is used when a height position in a Z-axis direction from the input surface of the tablet device 2 to the pen point of the electronic pen 1 is smaller than a critical height position Lz to be described later (when the height position is a height position B1 in FIG. 1, for example). On the other hand, a position indicated by the electronic pen 1, the position being detected by a spatial position detecting device 204, is used when the height position in the Z-axis direction from the input surface of the tablet device 2 to the pen point of the electronic pen 1 is equal to or higher than the critical height position Lz (when the height position is a height position B2 in FIG. 1, for example). In general, the accuracy of position detection by the indicated position detecting device 203 is higher than the accuracy of position detection by the spatial position detecting device 204. It is therefore preferable to continue to use the position detection by the indicated position detecting device 203 when the electronic pen 1 is separated from the input surface of the tablet device 2 for receiving an instruction input and is positioned in a hover region above the input surface, and use the position detection by the spatial position detecting device 204 when the height position is equal to or higher than the critical height position Lz.

The tablet device 2 of the spatial position indication system according to the present first embodiment includes a liquid crystal display (LCD) 201 as an example of a display device. A display screen 201D of the LCD 201 is disposed on the top surface of a casing 202.

In the tablet device 2, a sensor 2031 of an indicated position detecting device (hereinafter referred to as a digitizer) 203 that detects a position indicated by the electronic pen 1 is disposed on the back side of the LCD 201 in a state of being superposed on the LCD 201. As illustrated in FIG. 2, the digitizer 203 includes the sensor 2031 and a position detecting circuit 2032.

Though not illustrated, the sensor 2031 is formed by respectively arranging a plurality of loop coils in a horizontal direction (X-axis direction) of the casing 202 of the tablet device 2 and a vertical direction (Y-axis direction) of the casing 202. In the present example, the digitizer 203 is of an electromagnetic induction type. However, the present embodiment is not limited to this.

On the other hand, the electronic pen 1 includes a resonance circuit (not illustrated) constituted of a coil and a capacitor on a pen point side. Signals are sent and received between the electronic pen 1 and the sensor 2031 of the digitizer by electromagnetic induction coupling between the loop coils of the sensor 2031 of the digitizer 203 and the resonance circuit of the electronic pen 1. The electronic pen 1 is also of an electromagnetic induction type. However, the present embodiment is not limited to this.

The position detecting circuit 2032 of the digitizer 203 supplies a signal to the electronic pen 1 through the loop coils of the sensor 2031, receives a signal from the electronic pen 1 through the loop coils, and detects a position indicated by the electronic pen 1 in a detection region of the sensor 2031 based on the received signal. Incidentally, in the present embodiment, the digitizer 203 is configured to detect a position indicated by the pen point of the electronic pen 1.

In the present example, the loop coils of the sensor 2031 of the digitizer 203 are arranged so as to cover substantially the entire area of the display screen 201D of the LCD 201. Substantially the same region as the entire surface area of the display screen 201D is an input surface 203S (part enclosed by a dotted line in FIG. 1) for input of the electronic pen 1 to the sensor 2031.

In the present embodiment, a position detection region in which the position indicated by the electronic pen 1 can be detected by the digitizer 203 includes not only a planar region when the pen point of the electronic pen 1 is in contact with the input surface 203S of the digitizer 203 but also a spatial region (the hover region of a hovering state of the electronic pen 1) in which the pen point of the electronic pen 1 is not in contact with the input surface 203S of the digitizer 203 and is separated from the input surface 203S in a direction orthogonal to the input surface 203S (the Z-axis direction orthogonal to an X-axis direction and a Y-axis direction) but the position indicated by the electronic pen 1 can be detected through signal transmission and reception by electromagnetic coupling.

Figure 3:
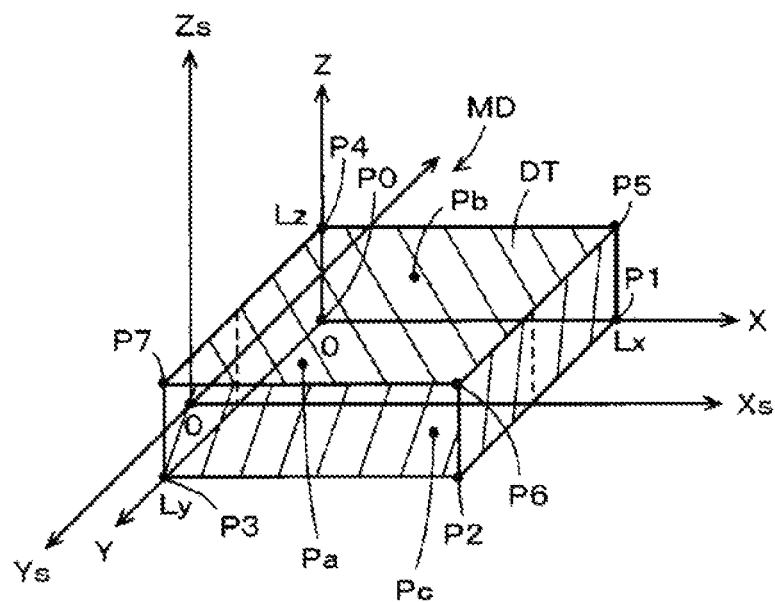
FIG. 3 is a diagram of assistance in explaining space coordinate systems in the first embodiment of the spatial position indication system according to the present disclosure.

For example, supposing that a position P0 at an upper left corner of the input surface 203S of the digitizer 203 is set as coordinates ((X, Y, Z)=(0, 0, 0)) of an origin in the X-axis direction, the Y-axis direction, and the Z-axis direction in FIG. 1, a position detection region DT in which the digitizer 203 can detect the position indicated by the electronic pen 1 is a planar region of the input surface 203S and a rectangular parallelepipedic spatial region over the input surface 203S, as indicated by hatching in FIG. 3.

Specifically, letting Lx be the length in the X-axis direction of the input surface 203S of the digitizer 203, letting Ly be the length in the Y-axis direction of the input surface 203S of the digitizer 203, and letting Lz be a critical height position in the Z-axis direction at which position a hovering state can be detected, as illustrated in FIG. 1, a region surrounded by coordinate point positions of eight points P0 (0, 0, 0), P1 (Lx, 0, 0), P2 (Lx, Ly, 0), P3 (0, Ly, 0), P4 (0, 0, Lz), P5 (Lx, 0, Lz), P6 (Lx, Ly, Lz), and P7 (0, Ly, Lz) as illustrated in FIG. 3 is the position detection region DT of the digitizer 203.

The tablet device 2 according to the present first embodiment further includes the spatial position detecting device 204 as a means for detecting the spatial position of the electronic pen 1 separately from the digitizer 203. As illustrated in FIG. 1, a spatial position detecting device 2041 of the spatial position detecting device 204 is disposed on the top surface of the casing 202. The spatial position detecting device 2041 in the present example includes an invisible light sensor (for example an infrared light emitting device (infrared light emitting diode (LED)) and an infrared camera or the like), though not illustrated. However, the present embodiment is not limited to this. Another sensor such as a visible light sensor or the like or a combination of these sensors may be used. In addition, the spatial position of the electronic pen 1 may be detected with the critical height position raised by increasing the frequency of an electromagnetic wave emitted from the digitizer 203 in place of the spatial position detecting device 2041 or in addition to the spatial position detecting device 2041. That is, it suffices, for example, to normally detect the position of the electronic pen 1 in the spatial region including the input surface of the digitizer 203 and the hover region at a first frequency, and switch to a second frequency higher than the first frequency and detect the spatial position of the electronic pen 1 at a second critical height position higher than a first critical height position at the first frequency.

The infrared light emitting device of the spatial position detecting device 2041 of the spatial position detecting device 204 sets a spatial region including at least a part of the position detection region DT of the digitizer as a search region, and emits infrared light so as to search for a thing present in the search region (which thing will be referred to as an object). That is, the infrared light emitting device of the spatial position detecting device 2041 emits infrared light so as to search a space including at least a part of the position detection region DT of the digitizer. Then, the infrared camera of the spatial position detecting device 2041 detects the presence and position of the object by receiving reflected light of the infrared light from the object present in the spatial region. As described earlier, in the present embodiment, the object detected by the spatial position detecting device 204 is the electronic pen 1, and for example the pen point position of the electronic pen 1 is detected.

The spatial position detecting device 204 in the second embodiment is configured to detect the spatial position of the pen point of the electronic pen 1 in consideration of continuity with the position indicated by the electronic pen 1 which position is detected by the digitizer 203. However, the present embodiment is not limited to this. The spatial position detecting device 204 may be configured to detect the position(s) of another one or a plurality of parts of the electronic pen 1. The tablet device 2 in the present embodiment can be configured to detect a gesture performed by an operator of the electronic pen 1 from movement of the pen point of the electronic pen 1 which movement is obtained from the spatial position of the pen point, the spatial position being detected by the spatial position detecting device 204.

A spatial position detecting circuit 2042 (see FIG. 2) of the spatial position detecting device 204 detects the position of the object, or the pen point position of the electronic pen 1 in the present example, within the above-described large spatial region from light reception information (a light receiving direction, a difference between a light emission time and a light reception time, and the like) of the reflected light received by the infrared camera. The spatial position detecting device 204 in the present example detects the movement of the pen point position of the electronic pen 1 within the spatial region. In the present specification, the spatial region as a target searched by the spatial position detecting device 204 will be referred to as a movement detection spatial region MD for convenience.

The space coordinate system of the movement detection spatial region MD of the spatial position detecting device 204 can be set independently of the space coordinate system of the position detection region DT of the digitizer 203. In FIG. 3, the three axes of the space coordinate system of the movement detection spatial region MD are set as an Xs-axis, a Ys-axis, and a Zs-axis by using a suffix s, and are illustrated so as to be differentiated from the X-axis, Y-axis, and Z-axis of the space coordinate system of the detection region DT of the digitizer 203. In this case, the movement detection spatial region MD of the spatial position detecting device 204 is defined such that, in the present example, as illustrated in FIG. 3, the central position of a part in which the spatial position detecting device 2041 is installed in the casing 202 of the tablet device 2 is set as the origin position of the space coordinate system of the movement detection spatial region MD.

Incidentally, in FIG. 3, the respective directions of the Xs-axis, the Ys-axis, and the Zs-axis are illustrated as the same directions as the respective directions of the X-axis, the Y-axis, and the Z-axis for convenience. However, the respective directions of the Xs-axis, the Ys-axis, and the Zs-axis can be different from the respective directions of the X-axis, the Y-axis, and the Z-axis because of the optical axis direction of the infrared light emitting device and the infrared camera constituting the spatial position detecting device 2041.

However, in the present embodiment, positional information on the position of the pen point of the electronic pen 1 can be subjected to coordinate transformation using spatial position correction information to be described later, by using a region common to the space coordinate system of the position detection region DT of the digitizer 203 and the space coordinate system of the movement detection spatial region MD of the spatial position detecting device 204. That is, the space coordinate system of the movement detection spatial region MD of the spatial position detecting device 204 is disposed so as to include at least a part of the space coordinate system of the position detection region DT of the digitizer 203 as the common region.

Incidentally, when the respective directions of the Xs-axis, the Ys-axis, and the Zs-axis are the same directions as the respective directions of the X-axis, the Y-axis, and the Z-axis, the space coordinate system of the position detection region DT of the digitizer 203 and the space coordinate system of the movement detection spatial region MD can be treated as one common space coordinate system by considering a difference between the origin positions of the two space coordinate systems. That is, letting, for example, $\Delta x$, $\Delta y$, and $\Delta z$ be offset values in the X-axis direction, the Y-axis direction, and the Z-axis direction, respectively, between the origin position of the space coordinate system of the position detection region DT of the digitizer 203 and the origin position of the space coordinate system of the movement detection spatial region MD, a coordinate value (Xs, Ys, Zs) in the space coordinate system of the movement detection spatial region MD can be transformed into a coordinate value (X, Y, Z) in the space coordinate system of the position detection region DT of the digitizer 203 by obtaining Xs−Δx (=X), Ys−Δy (=Y), and Zs−Δz (=Z).

However, in the tablet device 2 according to the present first embodiment, as described above, the respective directions of the X-axis, the Y-axis, and the Z-axis can be different from the respective directions of the Xs-axis, the Ys-axis, and the Zs-axis in the space coordinate system of the position detection region DT of the digitizer 203 and the space coordinate system of the movement detection spatial region MD, the space coordinate systems being provided independently of each other. In addition, even in a case where the respective directions of the X-axis, the Y-axis, and the Z-axis and the respective directions of the Xs-axis, the Ys-axis, and the Zs-axis are the same, it is difficult to define the offset values between the origin positions accurately, and the offset values may differ for each tablet device 2.

Figure 4:
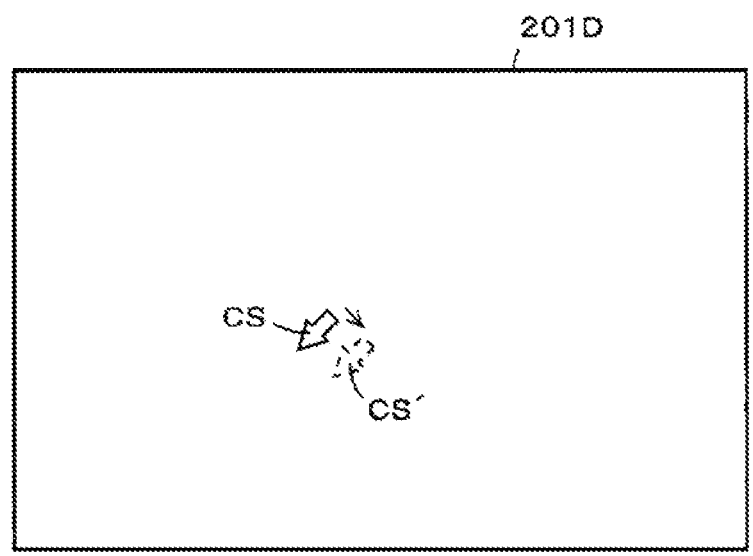
FIG. 4 is a diagram of assistance in explaining a part of operation of the first embodiment of the spatial position indication system according to the present disclosure.

Then, a coordinate position in the two space coordinate systems becomes different. For example, in a case where the pen point position of the electronic pen 1 is indicated by a cursor such as an arrow or the like on the display screen 201D, a jump may occur from the display position of a solid line cursor CS to the state of a broken line cursor CS', as illustrated in FIG. 4, when switching is performed between the two space coordinate systems, that is, the space coordinate system of the position detection region DT of the digitizer 203 and the space coordinate system of the movement detection spatial region MD. Therefore, a user attempting to input a drawing image needs to indicate the indicated position again.

Accordingly, the present first embodiment generates correction information for an offset between the space coordinate system of the detection region DT of the digitizer 203 and the space coordinate system of the movement detection spatial region MD by utilizing a fact that at least a part of the position detection region DT of the digitizer 203 is a spatial region shared with the movement detection spatial region MD. In the present example, a coordinate value corrected for the offset between the coordinate value (X, Y, Z) in the space coordinate system of the position detection region DT of the digitizer 203 and the coordinate value (Xs, Ys, Zs) in the space coordinate system of the movement detection spatial region MD, the coordinate value (Xs, Ys, Zs) being detected by the spatial position detecting circuit 2042 of the spatial position detecting device 204, can be obtained by transforming the coordinate value (X, Y, Z) into the coordinate value (Xs, Ys, Zs). The correction information for the transformation will next be described.

Equation 1 represents a determinant for linear transformation of the coordinate value (Xs, Ys, Zs) in the space coordinate system of the movement detection spatial region MD which coordinate value is detected by the spatial position detecting circuit 2042 of the spatial position detecting device 204 into the coordinate value (X, Y, Z) in the space coordinate system of the position detection region DT of the digitizer 203. This determinant has three rows and three columns. The elements of the determinant are expressed by $a_{ij}$ (i, j=1, 2, 3).

[Math. 1]

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Xs \\ Ys \\ Zs \end{bmatrix} \quad \text{(Equation 1)}$$

In the present first embodiment, the correction information for transformation between the space coordinate system of the detection region DT of the digitizer and the space coordinate system of the movement detection spatial region MD is generated by utilizing a fact that at least a part of the position detection region DT of the digitizer is a spatial region shared with the movement detection spatial region MD.

Specifically, as illustrated in FIG. 3, the positions of at least three points Pa, Pb, and Pc within the spatial region common to the position detection region DT of the digitizer and the movement detection spatial region MD are specified, and the coordinate value (X, Y, Z) of each of the points in the space coordinate system of the position detection region DT of the digitizer 203 and the coordinate value (Xs, Ys, Zs) of each of the points in the space coordinate system of the movement detection spatial region MD are obtained from the respective devices. Ideally, the coordinate values obtained from these devices are the same, but usually these coordinate values do not coincide with each other unless calibration is performed. In general, the accuracy of position detection of the digitizer 203 is higher than the accuracy of position detection of the spatial position detecting device 204. It is therefore preferable to adjust the coordinate value in the space coordinate system of the movement detection spatial region MD of the spatial position detecting device 204 to the coordinate value in the space coordinate system of the position detection region DT of the digitizer 203.

Three equations are obtained for each point whose position is specified within the common region when the corresponding coordinate value (X, Y, Z) in the space coordinate system of the position detection region DT and the corresponding coordinate value (Xs, Ys, Zs) in the space coordinate system of the movement detection spatial region MD are substituted into Equation 1. At least nine equations for $a_{11}$ to $a_{33}$ are obtained by specifying the positions of at least three points within the common region. The value of each of $a_{11}$ to $a_{33}$ can therefore be obtained. In addition, the transformation between the space coordinate system of the detection region DT of the digitizer and the space coordinate system of the movement detection spatial region MD is not limited to the above-described method, but learning based on machine learning using the coordinate values of at least three points in the common region, calibration by the user, or the like may be used.

As described above, the tablet device 2 according to the first embodiment is configured such that at least a part of the position detection region DT of the digitizer 203 is included within the movement detection spatial region MD of the spatial position detecting device 204. That is, the tablet device 2 is configured such that the movement detection spatial region MD of the spatial position detecting device 204 has at least a part of the position detection region DT of the digitizer 203 as the common region.

The tablet device 2 according to the present embodiment is configured to perform switching as to whether to use the position indicated by the electronic pen 1 which position is detected by the digitizer 203 (first position) or to use the position of the electronic pen 1 in the spatial region which position is detected by the spatial position detecting device 204 (second position) according to a separation distance (separation distance in the Z-axis direction) of the pen point position of the electronic pen 1 from the input surface 203S of the sensor 2031 of the digitizer 203.

Figure 5:
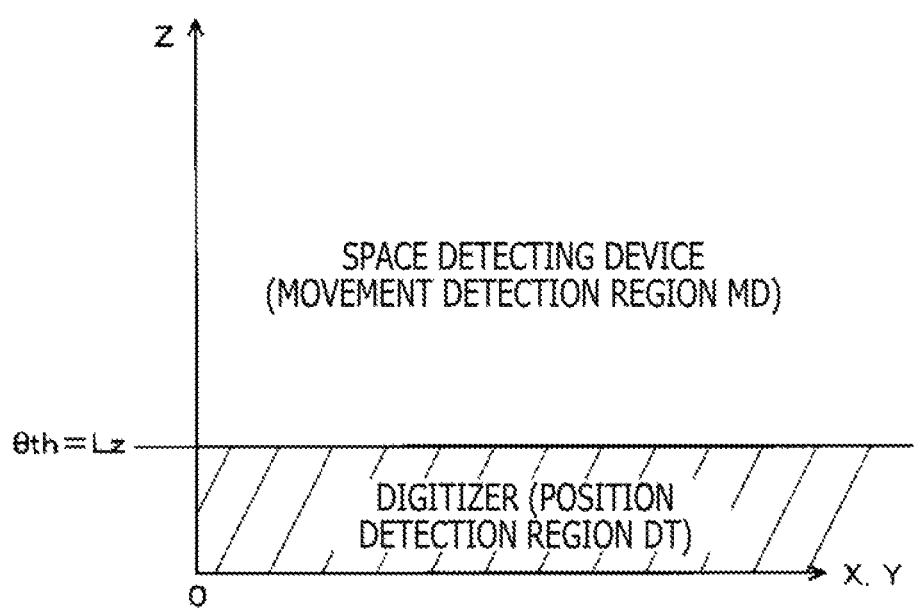
FIG. 5 is a diagram of assistance in explaining switching between the coordinate systems for detection of the position of the electronic pen in the first embodiment of the spatial position indication system according to the present disclosure.

Specifically, as illustrated in FIG. 5, letting θth be the separation distance (separation distance in the Z-axis direction) as a switching point from the input surface 203S, when the separation distance of the electronic pen 1 from the input surface 203S is smaller than θth, the digitizer 203 of the tablet device 2 operates as a device that detects the position indicated by the electronic pen 1 in the position detection region DT and performs processing according to the detected indicated position. On the other hand, when the separation distance of the electronic pen 1 from the input surface 203S is larger than θth, the tablet device 2 is switched such that the spatial position detecting device 204 operates as a device that detects the position of the electronic pen 1 within the spatial region and performs processing according to the position.

In the present embodiment, the separation distance (separation distance in the Z-axis direction) θth as the switching point from the input surface 203S is set equal to or less than a critical height distance Lz in the Z-axis direction at which distance the digitizer 203 can detect the hovering state of the electronic pen 1. In the present example, as illustrated in FIG. 5, the separation distance θth as the switching point from the input surface 203S is set equal to the critical height distance Lz in the Z-axis direction at which distance the digitizer 203 can detect the hovering state of the electronic pen 1, that is, a length Lz in the Z-axis direction of the position detection region DT.

Specifically, the tablet device 2 is switched so as to use a result of detection of the position of the electronic pen 1 by the digitizer 203 when the electronic pen 1 is present within the position detection region DT of the digitizer 203 and use a result of detection of the movement of the electronic pen 1 by the spatial position detecting device 204 when the electronic pen 1 is present on the outside of the position detection region DT of the digitizer 203. In addition, drawing processing is switched according to the switching.

In the present embodiment, the signal level (signal strength) of a signal received from the electronic pen 1 in the sensor 2031 of the digitizer 203 is a value according to the separation distance, and therefore the tablet device 2 detects the separation distance (separation distance in the Z-axis direction) of the pen point position of the electronic pen 1 from the input surface 203S of the sensor 2031 of the digitizer 203 based on the signal level of the signal received from the electronic pen 1.

Description will next be made of an example of constituent parts of the tablet device 2 that implements the above. Specifically, the position detecting circuit 2032 constituting the digitizer 203 supplies a detection output of the position indicated by the electronic pen 1 as one input signal to a selecting circuit 205. Incidentally, information supplied from the position detecting circuit 2032 to the selecting circuit 205 includes information on a pen pressure applied to the electronic pen 1 in addition to the detection output of the position indicated by the electronic pen 1. This pen pressure information indicates whether the electronic pen 1 is in contact with the input surface 203S, and makes it possible to draw a line drawing with a thickness corresponding to the magnitude of the pen pressure when the line drawing is drawn.

In addition, the spatial position detecting circuit 2042 of the spatial position detecting device 204 supplies a detection output of the spatial position of the electronic pen 1 to a spatial position coordinate correcting circuit 206. The spatial position coordinate correcting circuit 206 is supplied with the elements $a_{11}$ to $a_{33}$ of the determinant illustrated in the above-described (Equation 1) from a correction information memory 207. The spatial position coordinate correcting circuit 206 transforms the coordinate information in the space coordinate system of the spatial position detecting device 204 into coordinate information in the space coordinate system of the digitizer 203 by performing operation of the determinant of Equation 1 using the elements supplied from the correction information memory 207. The spatial position coordinate correcting circuit 206 then supplies a coordinate output after the transformation to a gesture detecting circuit 208.

The gesture detecting circuit 208 detects movement (gesture) of the pen point of the electronic pen 1 based on the coordinate output from the spatial position coordinate correcting circuit 206, and supplies a resulting detection output as another input signal of the selecting circuit 205.

In the present embodiment, the position detecting circuit 2032 of the digitizer 203 supplies a separation distance detecting circuit 210 with information regarding the signal level of a signal received from the electronic pen 1. The separation distance detecting circuit 210 in the present embodiment detects the separation distance of the pen point of the electronic pen 1 from the input surface 203S of the digitizer 203 from the signal level of the signal received from the electronic pen 1. The separation distance detecting circuit 210 then supplies information regarding the detected separation distance to a selection control signal generating circuit 211.

The selection control signal generating circuit 211 generates a selection control signal SE that controls the selecting circuit 205 so as to select the detection output of the digitizer 203 when the separation distance of the pen point of the electronic pen 1 from the input surface 203S of the digitizer 203 is equal to or smaller than the distance Lz, and controls the selecting circuit 205 so as to select the detection output of the gesture detecting circuit 208 when the separation distance of the pen point of the electronic pen 1 from the input surface 203S of the digitizer 203 is larger than the distance Lz. The selection control signal generating circuit 211 performs selection control of the selecting circuit 205 by the generated selection control signal SE.

The selecting circuit 205 selects either the one input or the other input according to the selection control signal SE, and supplies the input to a drawing processing circuit 212.

The drawing processing circuit 212 includes: a pen drawing processing circuit 2121 that draws a fine line drawing or the like based on the detection output of the position indicated by the electronic pen 1 from the digitizer 203; and a gesture processing circuit 2122 that performs drawing processing based on the movement (gesture) detected based on the spatial position of the electronic pen 1 from the spatial position detecting device 204. The drawing processing circuit 212 is supplied with a switching control signal SW from the switching signal generating circuit 211. The drawing processing circuit 212 switches between the pen drawing processing circuit 2121 and the gesture processing circuit 2122 so as to be interlocked with the switching of the switch circuit 205, and performs drawing processing of a three dimensional (3D) drawing image.

3D drawing image information generated by the drawing processing circuit 212 is, in the present example, supplied to a display device 201 formed by an LCD through a display drive circuit 213, and is displayed on the display screen 201D of the display device 201.

Figure 6A:
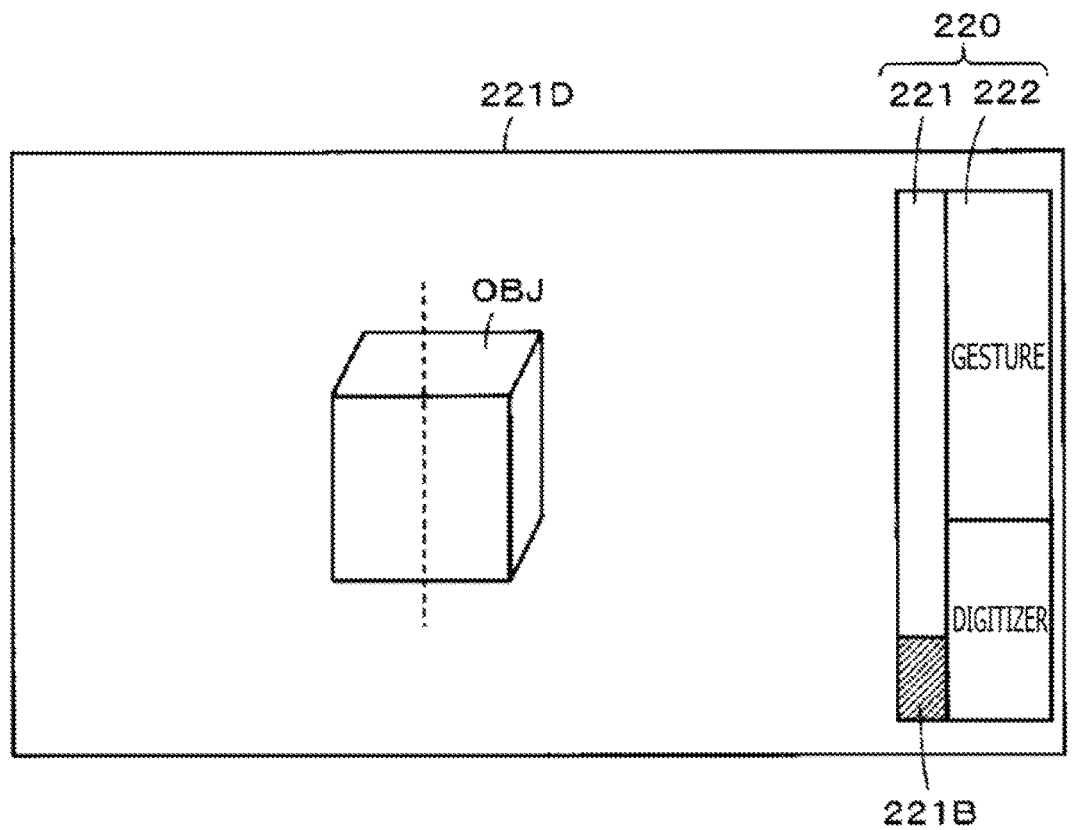
FIGS. 6A and 6B are diagrams illustrating examples of display images on a display screen of a display device in the first embodiment of the spatial position indication system according to the present disclosure.
Figure 6B:
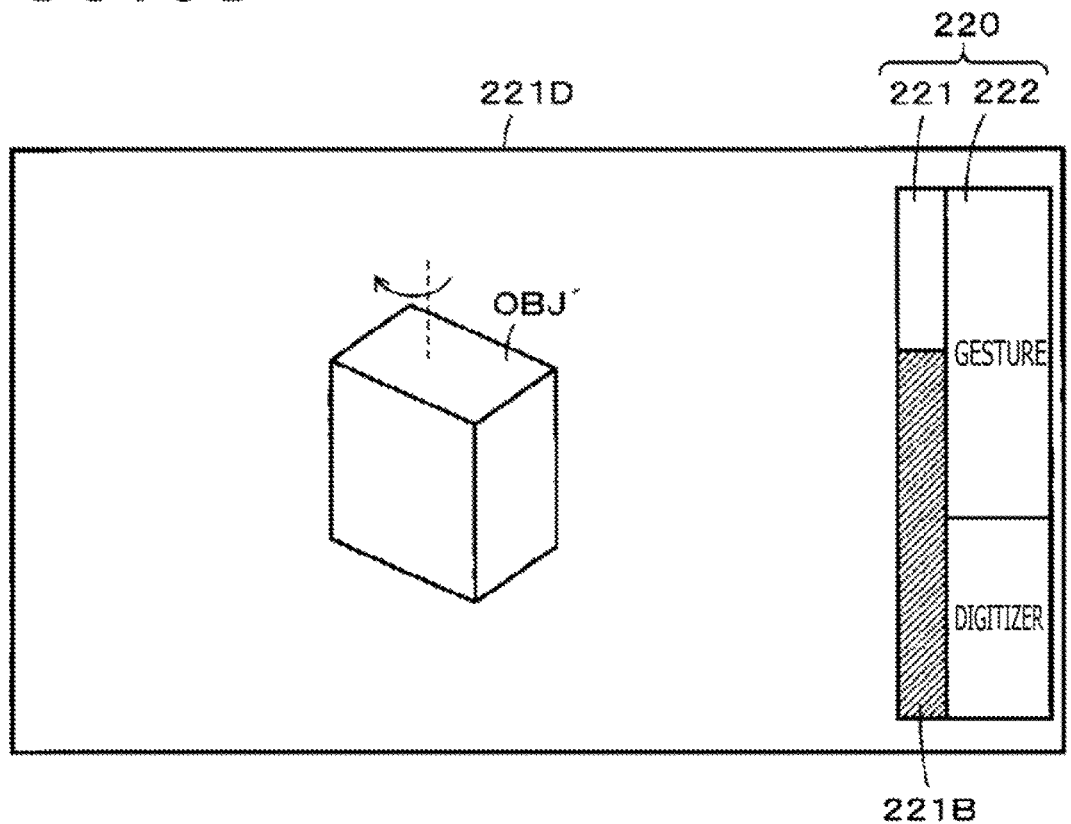

FIGS. 6A and 6B illustrate examples of the 3D drawing images displayed on the display screen 201D of the display device 201. In the present embodiment, as illustrated in FIGS. 6A and 6B, the display screen 201D displays a present mode display 220 that notifies the user whether the switching state of the switch circuit 205 is on the digitizer 203 side (tablet mode) or on the gesture detecting circuit 208 side (space mode). The present mode display 220 is for example generated by the drawing processing circuit 212 based on the switching control signal SW, and displayed in the displayed image.

The present mode display 220 is to notify the user whether the electronic pen 1 is present within the position detection region DT of the digitizer 203 or present within the movement detection spatial region MD of the spatial position detecting device 204. The present mode display 220 in the examples of FIGS. 6A and 6B includes: a bar display 221 that indicates in which region the electronic pen 1 is present by the height of a bar 221B illustrated hatched; and a text display section 222 for notifying which region is indicated by the bar display 221.

Incidentally, when the drawing processing circuit 212 is supplied with the detection output of the separation distance detecting circuit 210 and the coordinate output from the spatial position coordinate correcting circuit 206, the drawing processing circuit 212 can recognize the separation distance of the electronic pen 1 from the input surface 203S, and can therefore make display so as to make the height of the bar in the bar display 221 for the position of the electronic pen 1 in the present mode display 202 correspond to the separation distance of the electronic pen 1 from the input surface 203S.

FIG. 6A illustrates a display screen in a case where the electronic pen 1 is present within the position detection region DT of the digitizer 203 and a rectangular parallelepipedic object OBJ is drawn by the electronic pen 1.

FIG. 6B illustrates an example of a display image in a case where the user moves the electronic pen 1 to the outside of the position detection region DT of the digitizer 203 from the state of FIG. 6A, and performs a gesture operation such as rotates the rectangular parallelepipedic object OBJ as indicated by an arrow AR in FIG. 6B, for example.

The drawing in the position detection region DT of the digitizer 203 and the drawing in the movement detection spatial region MD of the spatial position detecting device 204 in FIGS. 6A and 6B are an example. Drawing processing such as moving the object, applying a pressure to the object, or deforming the object by pulling and stretching a part of the object can be performed as the drawing by the gesture operation.

Incidentally, the electronic pen 1 is provided with a pen pressure detecting circuit that detects a pen pressure applied to the pen point when the electronic pen 1 is in contact with the input surface 203S. Information regarding a result of the detection of the pen pressure detecting circuit is transmitted to the tablet device 2. A fine drawing operation by the electronic pen 1 is often performed in a state in which the electronic pen 1 is in contact with the input surface 203S. Accordingly, the tablet device 2 may distinguish the state in which the electronic pen 1 is in contact with the input surface 203S and the hovering state in which the electronic pen 1 is not in contact with the input surface 203S based on the information regarding the pen pressure detection result which information is received from the electronic pen 1, and make text display such for example as a "contact state," a "hovering state," or the like on the display screen 201D to notify the operator of the state in which the electronic pen 1 is in contact with the input surface 203S or the hovering state in which the electronic pen 1 is not in contact with the input surface 203S.

Incidentally, the tablet device 2 includes a control circuit 200 formed by a computer that includes a processor and a memory, for example, and operates each circuit described above based on control of the control circuit 200. Incidentally, the respective processing of the spatial position coordinate correcting circuit 206, the gesture detecting circuit 208, the separation distance detecting circuit 210, the selection control signal generating circuit 211, and the drawing processing circuit 212 can also be configured as software functional blocks executed by the control circuit 200 by a software program.

The correction information memory 207 can store the elements $a_{11}$ to $a_{33}$ of the determinant before factory shipment of the tablet device 2. However, in the present embodiment, to be able to make correction including an error of each tablet device 2, the user can store correction information (the elements $a_{11}$ to $a_{33}$ of the determinant) in the correction information memory 207 before starting the tablet device 2 by making the tablet device 2 perform correction information generation and storage processing.

A correction information generating circuit 209 illustrated in FIG. 2 is a processing device for that purpose, and performs correction information generation processing based on control of the control circuit 200. The correction information generating circuit 209 can also be provided as an application for the correction information generation and storage processing to the control circuit 200.

At a time of a first start of the tablet device 2, the correction information generating circuit 209 is controlled to operate by the control circuit 200. Then, the control circuit 200 prompts the user to indicate the positions of at least three points by the electronic pen 1 in the position detection region DT of the digitizer 203 which region is common to the spatial position detecting device 204 and the digitizer 203. When the user accordingly indicates the positions of three points or more, detected coordinate information of the digitizer 203 and detected coordinate information of the spatial position detecting device 204 for the three points or more are captured into the correction information generating circuit 209, as described earlier.

Then, the correction information generating circuit 209 calculates the elements $a_{11}$ to $a_{33}$ of the determinant as described earlier by using the captured coordinate information of the three points or more, and stores the elements $a_{11}$ to $a_{33}$ of the determinant in the correction information memory 207.

Incidentally, the calculation of the elements $a_{11}$ to $a_{33}$ of the determinant by the correction information generating circuit 209 and the processing of storing the elements $a_{11}$ to $a_{33}$ of the determinant into the correction information memory 207 as described above may of course be set in advance before sale to the user, rather than being performed by the user.

Because the tablet device 2 according to the present embodiment is configured as described above, when the electronic pen 1 is in contact with the input surface 203S of the digitizer 203 or is in the hovering state, the digitizer 203 detects the position indicated by the electronic pen 1, and the tablet device 2 performs fine drawing by line drawing, and when the electronic pen 1 is separated by more than the separation distance Lz from the input surface 230S, the tablet device 2 switches to spatial position detection in the spatial position detecting device 204, detects the movement (gesture) of the electronic pen 1, and performs an operation according to the detected movement (gesture).

Hence, the operator can seamlessly perform an operation by gesture from fine drawing merely by spatially moving the electronic pen 1 over the tablet device 2 without being aware of switching between the digitizer 203 and the spatial position detecting device 204.

The tablet device 2 according to the present embodiment transforms the coordinate output of the digitizer 203 into a value in the space coordinate system of the spatial position detecting device 204. It is thus possible to prevent the problem of a jump of the cursor position displayed on the display screen according to the detected position of the electronic pen 1 even when the space coordinate system is switched.

In addition, the display screen 201D of the display device 201 of the tablet device 2 displays an indication of a state in which the digitizer 203 is detecting the position indicated by the electronic pen 1 or a state in which the spatial position detecting device 204 is detecting the spatial position of the electronic pen 1 according to the separation distance of the electronic pen 1 from the input surface 203S. Thus, the operator of the electronic pen 1 can accurately grasp which operation to perform at the spatial position of the electronic pen 1 at a time point in question.

Modification of First Embodiment

First Modification

Incidentally, in the description of the foregoing first embodiment, the digitizer 203 obtains the separation distance of the electronic pen 1 from the input surface 203S based on the signal level of the signal received from the electronic pen 1, and generates the switching signal of the switch circuit 205 from the obtained separation distance. However, the method of calculating the separation distance of the electronic pen 1 from the input surface 203S is not limited to the above-described example.

For example, it is also possible for the electronic pen 1 to detect the signal level of a signal received from the sensor 2031 of the digitizer 203 of the tablet device 2 when the electronic pen 1 receives the signal, and transmit information regarding the signal level to the tablet device 2. FIG. 7 is a diagram illustrating an example of a configuration of principal parts of a thus configured electronic pen 1A and a tablet device 2A.

In the present example, the electronic pen 1A includes a received signal level detecting circuit 101 that detects the signal level of a signal received from the sensor 2031 of the digitizer 203 of the tablet device 2A, and includes a wireless communicating device 102 that performs wireless communication of a Bluetooth (registered trademark) standard, for example. Then, the electronic pen 1A transmits information regarding the signal level of the signal received from the sensor 2031 which signal level is detected by the received signal level detecting circuit 101 to the tablet device 2A through the wireless communicating device 102.

The tablet device 2A includes a wireless communicating device 221 of the Bluetooth (registered trademark) standard for wirelessly communicating with the wireless communicating device 102, and includes a separation distance detecting circuit 222 and a selection control signal generating circuit 223 in place of the separation distance detecting circuit 210 and the switching signal generating circuit 211 in the example of FIG. 2. The separation distance detecting circuit 222 in the present example detects the separation distance of the electronic pen 1A from the input surface 203S of the digitizer 203 based on the information regarding the signal level from the electronic pen 1A which information is received by the wireless communicating device 221, and supplies information regarding the detected separation distance to the selection control signal generating circuit 223.

The selection control signal generating circuit 223 generates a selection control signal SEa that performs control so as to select the detection output of the digitizer 203 when the separation distance of the pen point of the electronic pen 1 from the input surface 203S of the digitizer 203 is equal to or smaller than the distance Lz, and select the detection output of the gesture detecting circuit 208 when the separation distance of the pen point of the electronic pen 1 from the input surface 203S of the digitizer 203 is larger than the distance Lz. The selection control signal generating circuit 223 performs switching control of the selecting circuit 205 by the generated switching control signal SEa.

A configuration of other parts of the tablet device 2A is similar to that illustrated in FIG. 2.

According to the configuration of the example of FIG. 7, the radio field intensity of the signal transmitted from the sensor 2031 of the digitizer 203 to the electronic pen 1A is higher than the radio field intensity of the signal received by the tablet device 2 from the electronic pen 1. Therefore, the separation distance detecting circuit 222 and the switching signal generating circuit 223 of the tablet device 2A can detect the position of the separation distance Lz at the switching point more accurately than in the case of the tablet device 2 having the configuration of FIG. 2.

Second Modification

In addition, in the above-described example, the separation distance of the electronic pen 1 or the electronic pen 1A from the input surface 203S of the digitizer 203 is detected based on the reception level of the signal between the sensor 2031 of the digitizer 203 and the electronic pen 1 or the electronic pen 1A. However, the selection control signal of the selecting circuit 205 can also be generated from the pen point position of the electronic pen 1 which position is detected by the spatial position detecting device 204.

Figure 8:
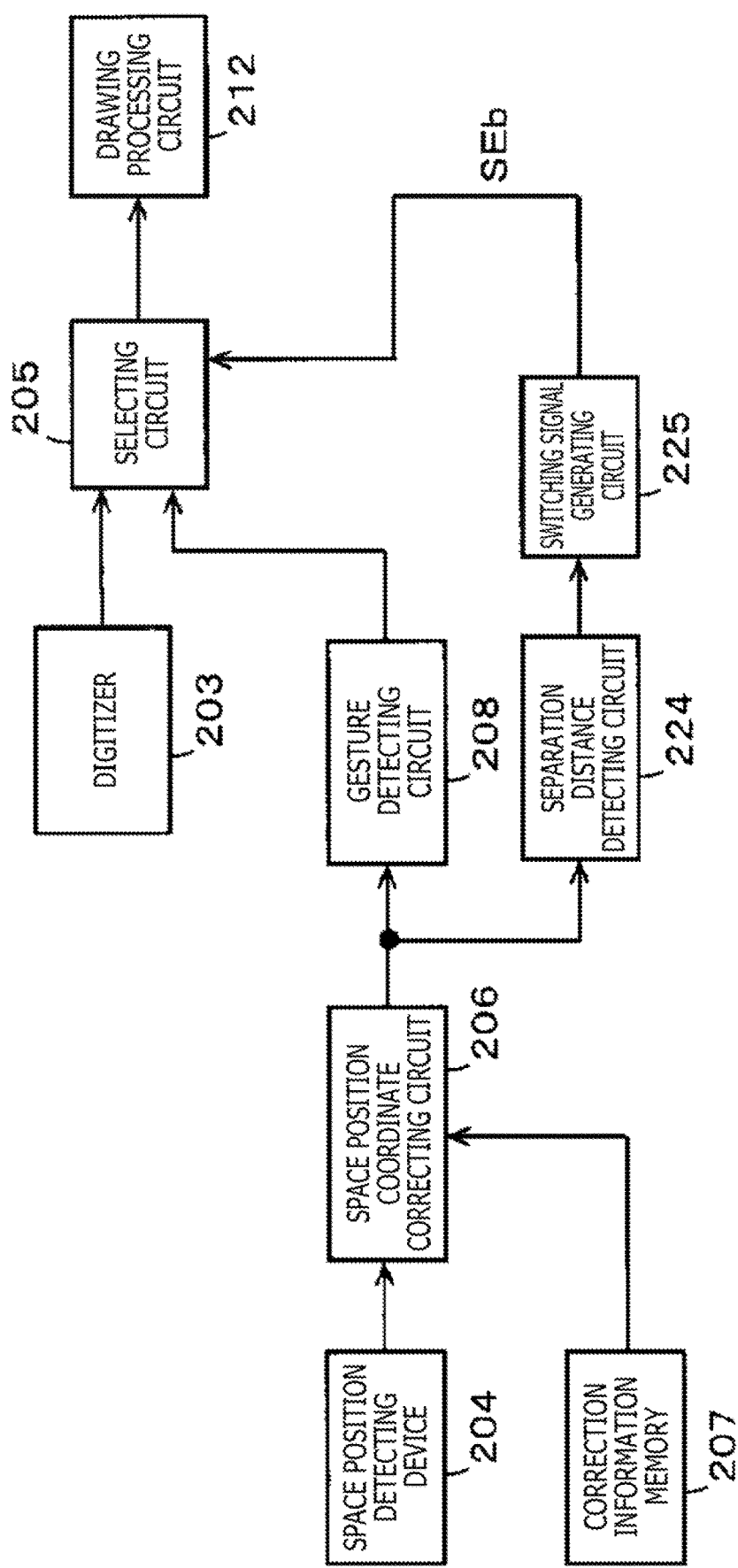
FIG. 8 is a diagram of assistance in explaining a modification of the first embodiment of the spatial position indication system according to the present disclosure.

FIG. 8 is a diagram illustrating an example of a configuration of principal parts of a thus configured tablet device 2B. Specifically, the tablet device 2B in the present example includes a separation distance detecting circuit 224 and a switching signal generating circuit 225 as illustrated in FIG. 8, in place of the separation distance detecting circuit 210 and the switching signal generating circuit 211 in the example of FIG. 2. In the present example, the separation distance detecting circuit 224 is supplied with the position coordinate output of the spatial position coordinate correcting circuit 206. The separation distance detecting circuit 224 detects the spatial position of the electronic pen 1 from the position coordinate output of the spatial position coordinate correcting circuit 206, detects the separation distance of the electronic pen 1A from the input surface 203S of the digitizer 203 from the Z-coordinate of the spatial position of the electronic pen 1, and supplies a resulting detection output to a selection control signal generating circuit 225.

The selection control signal generating circuit 225 generates a selection control signal SEb that performs control so as to select the detection output of the digitizer 203 when the separation distance of the pen point of the electronic pen 1 from the input surface 203S of the digitizer 203 is equal to or smaller than the distance Lz, and select the detection output of the gesture detecting circuit 208 when the separation distance of the pen point of the electronic pen 1 from the input surface 203S of the digitizer 203 is larger than the distance Lz. The selection control signal generating circuit 225 controls the selecting circuit 205 by the generated switching control signal SEb.

A configuration of other parts of the tablet device 2A is similar to that illustrated in FIG. 2.

Third Modification

In the description of the foregoing embodiment, a gesture is detected based on only changes in the position of the electronic pen 1 which position is detected by the spatial position detecting device 204. However, a finer gesture operation can be reflected in a drawing by providing the electronic pen with a movement detecting sensor that detects the movement of the electronic pen, sending also the detection output of the movement detecting sensor to the tablet device, and referring also to the detection output of the movement detecting sensor in the tablet device.

Figure 9:
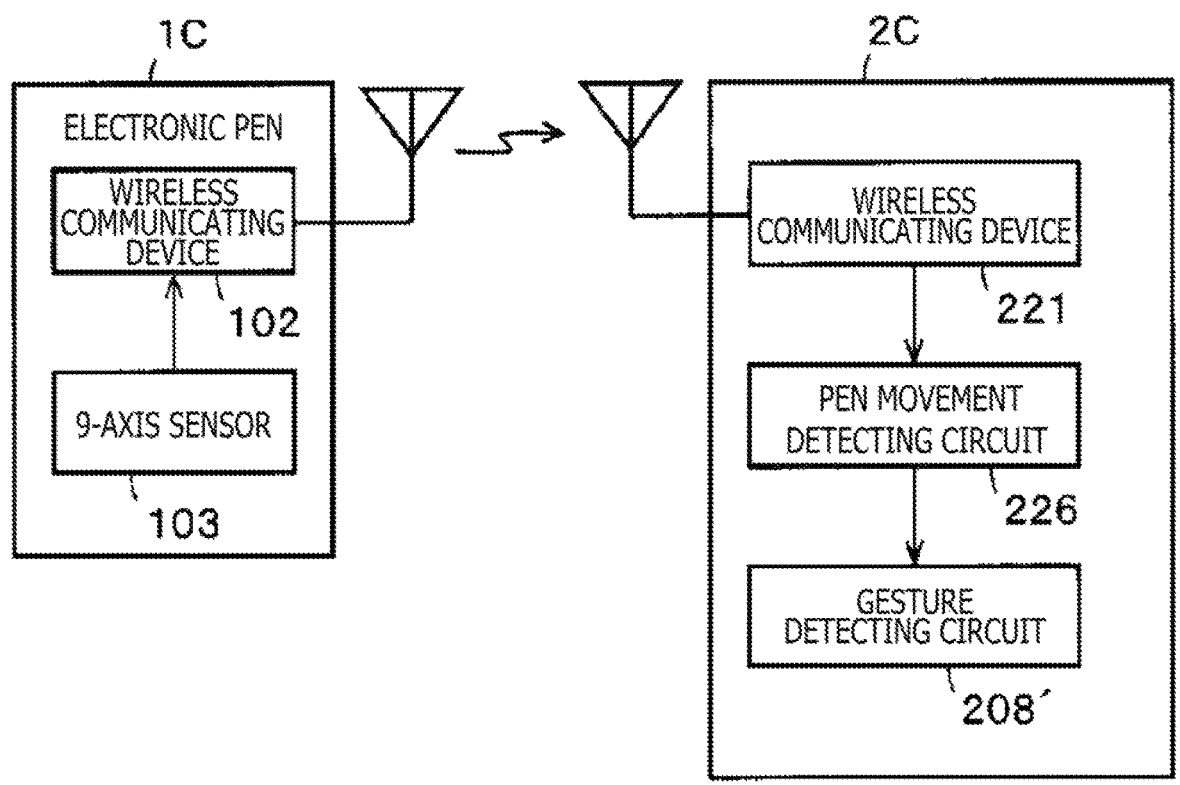
FIG. 9 is a diagram of assistance in explaining a modification of the first embodiment of the spatial position indication system according to the present disclosure.

FIG. 9 is a diagram illustrating an example of a configuration of principal parts of a thus configured electronic pen 1C and a tablet device 2C. In the example of FIG. 9, the electronic pen 1C includes a wireless communicating 102 similar to that of the modification of FIG. 7, and includes a 9-axis sensor 103 as a movement detecting sensor of the electronic pen 1C itself. As is well known, the 9-axis sensor 103 is a combination of a 3-axis gyro sensor, a 3-axis acceleration sensor, and a 3-axis geomagnetic sensor. The 9-axis sensor 103 sends out a 9-axis sensor output with regard to the movement of the electronic pen 1C.

The electronic pen 1C transmits the 9-axis sensor output with regard to the movement of the electronic pen 1C itself which movement is detected by the 9-axis sensor 103 to the tablet device 2C through the wireless communicating 102.

The tablet device 2C includes a wireless communicating device 221 similar to that of the modification of FIG. 7, and includes a pen movement detecting circuit 226. In the tablet device 2C, the wireless communicating device 221 supplies the 9-axis sensor output received from the electronic pen 1C to the pen movement detecting circuit 226. The pen movement detecting circuit 226 analyzes the 9-axis sensor output, detects the movement of the electronic pen 1C, and supplies a resulting detection output to a gesture detecting circuit 208'. The gesture detecting circuit 208' detects a gesture made by the operator of the electronic pen 1C by referring to the movement detection output of the electronic pen 1C from the pen movement detecting circuit 226 in addition to changes in spatial position coordinates from the spatial position coordinate correcting circuit 206.

A configuration of other parts of the tablet device 2C is similar to that illustrated in FIG. 2.

According to the example of FIG. 9, the tablet device 2C can finely detect a gesture by the operator of the electronic pen 1C, and can reflect, in drawing, the gesture of a finer movement than conventional.

Incidentally, while in the above example, the tablet device 2C uses the movement detection output of the electronic pen 1C which detection output is detected by the 9-axis sensor 103 and received from the electronic pen 1C when the tablet device 2C detects a gesture, the movement detection output of the electronic pen 1C may be used also when the digitizer 203 detects the position indicated by the electronic pen 1C. For example, because the inclination of the electronic pen 1C can be detected from the pen movement detection output, it is possible to detect the position indicated by the electronic pen 1C while referring to a result of the detection of the inclination. In addition, the inclination of the electronic pen 1C can also be reflected in the thickness of line drawing.

From a similar idea, in the tablet device 2 and the tablet devices 2A to 2C, it is also possible to detect the inclination of the electronic pen 1, the electronic pen 1A, electronic pen 1B, and the electronic pen 1C from a position detection result in the spatial position detecting device 204 when the digitizer 203 detects the position indicated by the electronic pen 1C, and to detect the position indicated by the electronic pen 1C while referring to the inclination.

Incidentally, the movement detection output of the pen movement detecting circuit 226 of the tablet device 2C can not only be used to detect a gesture and the position indicated by the electronic pen, but the movement detection output itself can also be reflected in drawing independently. In addition, it is needless to say that the tablet device may detect the movement detection output not only as a drawing operation but also as another input operation.

Fourth Modification

In the foregoing embodiment, in consideration of a fact that there is a fear of occurrence of an error in a result of electronic pen position detection between the space coordinate system of the digitizer 203 and the space coordinate system of the spatial position detecting device 204, the coordinate output of the space coordinate system of the spatial position detecting device 204 is transformed into the coordinate output of the space coordinate system of the digitizer 203 so as not to cause a change such that, for example, the display position of the cursor on the display screen 201D jumps when switching is performed between the two coordinate systems.

However, when the cursor position differs at a time of the switching between the two coordinate systems without such a correction being made, the change in the cursor position at the time of the switching can be made inconspicuous by displaying the cursor such that the position of the cursor is gradually changed from the cursor position in the space coordinate system before the switching to the cursor position in the space coordinate system after the switching.

Figure 10:
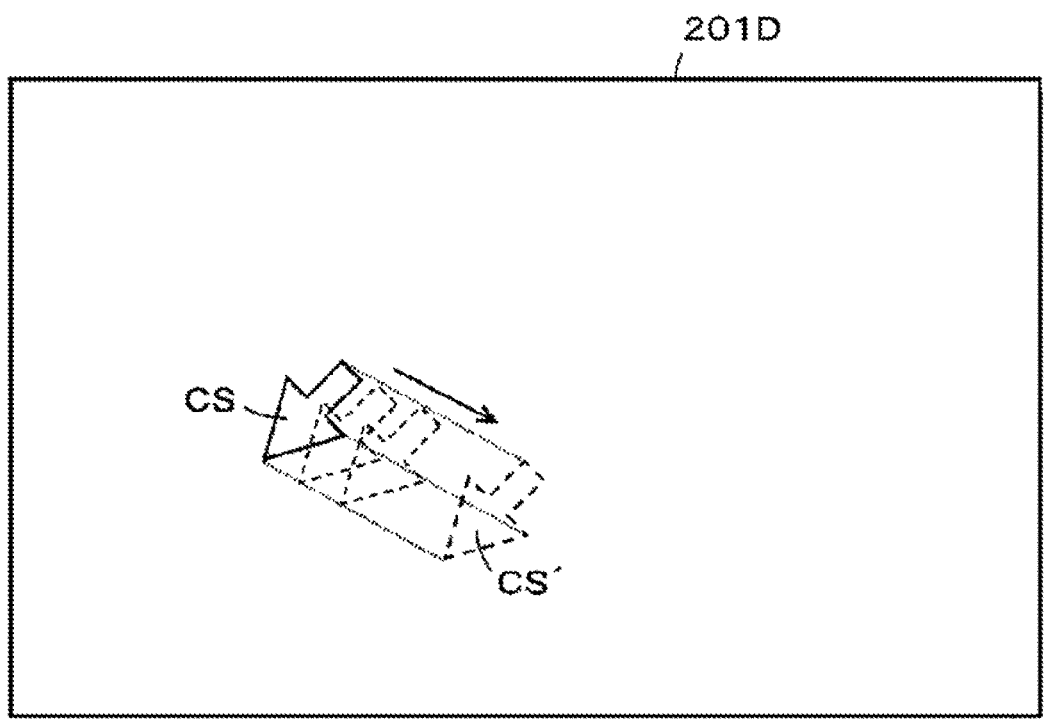
FIG. 10 is a diagram of assistance in explaining a modification of the first embodiment of the spatial position indication system according to the present disclosure.

Specifically, as illustrated in FIG. 10, for example, in a case where a solid line cursor CS is displayed on the display screen 201D before the switching between the space coordinate systems, and the cursor position after the switching between the space coordinate systems jumps to the position of a broken line cursor CS', the display position is gradually changed from the position of the solid line cursor CS to the position of the broken line cursor CS'. For this purpose, a gradually changing cursor position coordinate Pc is calculated from coordinate position information Pa of the solid line cursor CS and coordinate position information Pb of the broken line cursor CS'.

Specifically, the cursor position coordinate Pc is calculated as Equation 2 illustrated in the following.

[Math. 2]

$$Pc = \frac{Pa \times k1 + Pb \times k2}{k1 + k2} \quad \text{(Equation 2)}$$

In (Equation 2), k1 and k2 are weighting coefficients. Specifically, from a time point of the switching at which time point the cursor position coordinate Pc is the coordinate position information Pa of the solid line cursor CS, the value of the weighting coefficient k1 changes so as to decrease gradually from "1," whereas the value of the weighting coefficient k2 changes so as to increase gradually from "0."

Then, until a time point at which the position of the cursor CS reaches the position of the broken line cursor CS', the value of the weighting coefficient k1 changes so as to decrease gradually to "0," and the value of the weighting coefficient k2 is changed so as to increase gradually to "1."

Consequently, even when the display position is changed from the cursor CS to the cursor CS', the change becomes inconspicuous.

Incidentally, k1 and k2 may be variables $k1(t)$ and $k2(t)$ that change with time t. In this case, from the time point of the switching at which time point the cursor position coordinate Pc is the coordinate position information Pa of the solid line cursor CS, the value of the weighting coefficient $k1(t)$ can be changed so as to decrease gradually from "1," whereas the value of the weighting coefficient $k2(t)$ can be changed so as to increase gradually from "0."

Fifth Modification

In the above description, when the separation distance of the position of the electronic pen from the input surface 203S of the digitizer 203 exceeds Lz, switching is performed immediately from the detection of the position indicated by the electronic pen by the digitizer 203 to the detection of the spatial position of the electronic pen by the spatial position detecting device 204. However, in some cases, a state in which the operator has moved the electronic pen from the input surface 203S of the digitizer 203 of the tablet device to the position of a separation distance equal to or more than Lz may not be a state for gesture input in drawing.

Hence, the detection of the spatial position of the electronic pen by the spatial position detecting device 204 may not be started immediately when the separation distance from the input surface 203S of the digitizer 203 exceeds Lz, but may be started when a predetermined start trigger further occurs. Cited as an example of the predetermined start trigger in that case is, for example, sending of operation information of a side switch provided to the electronic pen so as to be operable by the operator to the tablet device through the wireless communicating device 102 when the operator operates the side switch.

Incidentally, not only in a case where the position of the electronic pen (position of the pen point) is moved to a position separated from the input surface of the digitizer but also in a case where the position of the electronic pen (position of the pen point) is moved from a spatial position separated from the input surface of the digitizer such that the distance from the input surface of the digitizer becomes less than Lz, switching may be similarly performed from the space coordinate system of the spatial position detecting device to the space coordinate system of the digitizer according to the user operation information of the side switch or the like, for example.

In addition, in a case where the electronic pen includes a 9-axis sensor, the 9-axis sensor may detect a movement of the electronic pen which movement is determined in advance as a movement of the predetermined start trigger, and a result of the detection may be transmitted to the tablet device through the wireless communicating device 102. In addition, the spatial position detecting device 204 of the tablet device may detect a gesture based on the movement of the electronic pen, and start a processing operation of detecting a gesture as a target of drawing processing when detecting a gesture based on the movement of the electronic pen which movement is determined in advance as the movement of the predetermined start trigger.

In addition, switching between the space coordinate system of the spatial position detecting device and the space coordinate system of the digitizer may be performed according to the movement of the electronic pen which movement is detected by the 9-axis sensor provided to the electronic pen.

Other Modifications

In the foregoing embodiment, the tablet device includes a display device. However, the display device may be separate from the tablet device, and the tablet device and the display device may be connected to each other by radio or by wire. It is needless to say that in that case, the input surface 203S of the digitizer 203 of the tablet device is not the top surface of the display screen of the display device, but is the top surface of the sensor 2031 of the digitizer 203. In addition, the device on which the spatial position detecting device 204 is disposed is not limited to the digitizer 203, but the spatial position detecting device 204 may be disposed on the display device separate from the digitizer 203 or another device.

In addition, the spatial position indication system according to the foregoing embodiment has the configuration of a system including the tablet device and the electronic pen, and the tablet device includes all of the digitizer, the spatial position detecting device, and the drawing information generating circuit. However, a configuration of the spatial position indication system may be formed by constituting parts other than the digitizer 203 and the spatial position detecting device 204 by a personal computer, for example, and connecting a tablet device having only the functions of the digitizer and the spatial position detecting device to the personal computer.

Incidentally, while in the foregoing embodiment, a coordinate value in the space coordinate system of the digitizer 203 is transformed into a coordinate value in the spatial position detecting device 204 in order to correct an error between the two space coordinate systems, a coordinate value in the spatial position detecting device 204 may be conversely transformed into a coordinate value in the detection region DT of the digitizer 203.

In addition, in the foregoing example, whether the tablet device 2 is in a state of the tablet mode or in a state of the space mode is notified to the operator through display on the display screen 201D by the present mode display 220. It is needless to say, however, that the present mode display 220 is not limited to the bar display as illustrated in FIGS. 6A and 6B. In addition, the present mode may be emitted as a sound from a speaker provided to the tablet device 2.

SECOND EMBODIMENT

Figure 11:
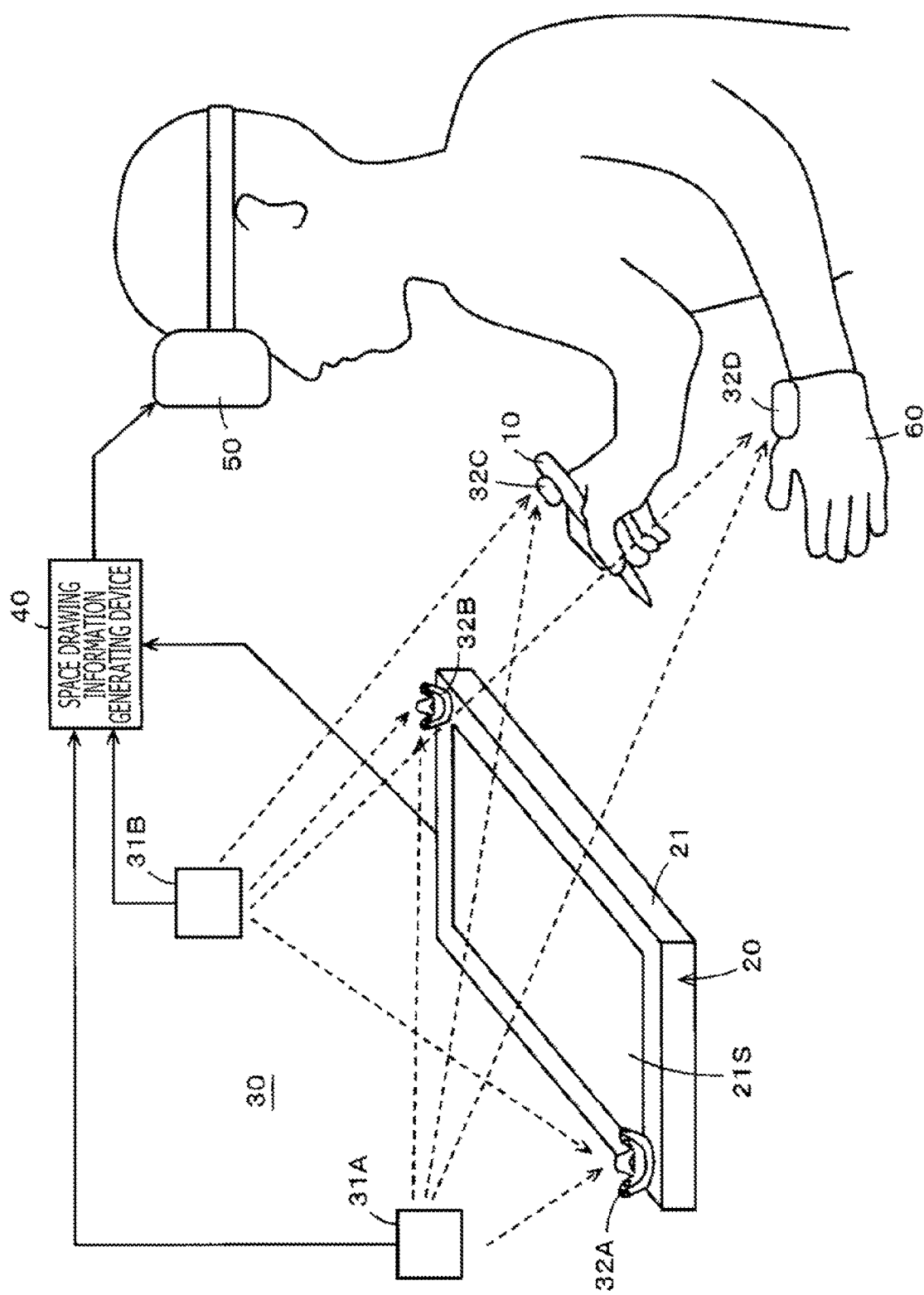
FIG. 11 is a diagram of assistance in explaining an outline of a second embodiment of the spatial position indication system according to the present disclosure.

The display device in the spatial position indication system according to the present disclosure can be of a configuration of a head-mounted display, and a 3D drawing space can be a space of virtual reality (which includes virtual reality (VR), mixed reality (MR), augmented reality (AR), and the like, and will hereinafter be abbreviated to VR). FIG. 11 is a diagram illustrating an outline of a configuration of the whole of a spatial position indication system according to a second embodiment in which a VR space is a 3D drawing space.

Specifically, as illustrated in FIG. 11, the spatial position indication system according to the second embodiment includes an electronic pen 10, a digitizer 20, a spatial position detecting device 30, a space drawing information generating device 40, and a head-mounted display (hereinafter referred to as an HMD) 50.

As with the electronic pen 1 according to the first embodiment, an electronic pen of an electromagnetic induction type is used as an example of the electronic pen 10 also in the second embodiment. However, the present embodiment is not limited to this. The digitizer 20 has a casing 21 of a thin rectangular parallelepipedic shape similar to that of the casing of the tablet device 2 according to the first embodiment, and has a top surface as an input surface 21S. The digitizer 20 has a configuration similar to that of the digitizer 203 according to the first embodiment. The digitizer 20 includes a sensor 22 and a position detecting circuit 23. The digitizer 20 has a position detection region including not only the region of the input surface 21S but also a hover region as a spatial region over the input surface 21 (which position detection region will hereinafter be referred to as a position detection region DT' (not illustrated) in order to be distinguished from the position detection region DT of the digitizer 203 according to the first embodiment) as in the position detection region DT of the digitizer 203 according to the first embodiment (see the position detection region DT in FIG. 3). Positional information of the electronic pen 10 detected in the position detection region DT' in the digitizer 20 is supplied to the space drawing information generating device 40.

The spatial position detecting device 30 sets a movement detection target spatial region in which to detect movement of the operator of the electronic pen 10. The spatial position detecting device 30 includes two light emission tracking devices 31A and 31B and a plurality of light position notifying devices (hereinafter referred to as trackers) 32A, 32B, 32C, and 32D. Incidentally, in the second embodiment, as will be described later, the HMD 50 displays a 3D drawing image drawn in the movement detection target spatial region as a virtual display image. The movement detection target spatial region in the second embodiment will hereinafter be described as a movement detection target spatial region MDv.

The two light emission tracking devices 31A and 31B have an identical configuration. The light emission tracking devices 31A and 31B each include: a laser light emitting device for infrared laser light; search means for searching within the movement detection target spatial region MDv by emitted infrared laser light; and light position detecting means for detecting light emission of light emitting devices of the trackers 32A, 32B, 32C, and 32D receiving the infrared laser light.

The trackers 32A, 32B, 32C, and 32D include: a light receiving sensor that detects the infrared laser light from the light emission tracking devices 31A and 31B; and a light emitting device formed by an LED, for example, for notifying the light emission tracking devices 31A and 31B of light reception of the infrared laser light by the light receiving sensor when detecting the light reception of the infrared laser light. In the present example, the trackers 32A, 32B, 32C, and 32D are provided with a plurality of light receiving sensors to be able to receive laser light from any direction, and is also provided with a 9-axis sensor, for example, for detecting movement and directions (orientations). The trackers 32A, 32B, 32C, and 32D are attached to objects as targets of position detection within the movement detection target spatial region MDv. Reception output of the light receiving sensors and output of the 9-axis sensor are supplied from each of the trackers 32A, 32B, 32C, and 32D to the space drawing information generating device 40 by wire or by radio or via the objects to which the trackers 32A, 32B, 32C, and 32D are attached.

The light emission tracking devices 31A and 31B control the laser light emitting devices by the search means, and make a search by emitting infrared laser light so as to perform search and scanning within the movement detection target spatial region MDv to detect tracker positions. Each of the trackers 32A, 32B, 32C, and 32D monitors for light reception of the infrared laser light by the sensor, and lights the light emitting device formed by an LED when the sensor detects light reception of the infrared laser light. The light emission tracking devices 31A and 31B detect the positions of the objects to which the trackers 32A, 32B, 32C, and 32D are fitted within the movement detection target spatial region MDv by detecting light emission of the light emitting devices of the trackers 32A, 32B, 32C, and 32D. The light emission tracking devices 31A and 31B are configured to be able to detect also elapsed times from light emission times of the emitted infrared lasers to time points of detection of the light emission of the light emitting devices of the trackers 32A, 32B, 32C, and 32D when detecting the light emission.

The two light emission tracking devices 31A and 31B are connected to the space drawing information generating device 40 by wire or by radio, and notifies the space drawing information generating device 40 of space position information of the detected trackers in the movement detection target spatial region MDv.

The objects to which the trackers 32A, 32B, 32C, and 32D are fitted in the present embodiment are a dedicated device 60 for a glove (glove device) that the operator wears in the present example as illustrated in FIG. 11 as well as the electronic pen 10 and the digitizer 20. The trackers are attached to the electronic pen 10, the digitizer 20, and the glove device 60, respectively. Specifically, in the present example, the tracker 32A and the tracker 32B are fitted to an upper left corner and a lower right corner of a casing of the digitizer 20 in a thin rectangular parallelepidic shape to be able to notify the position of the digitizer 20. In addition, the tracker 32C is fitted to the electronic pen 10 to notify the position of the electronic pen 10 and notify the movement of the electronic pen 10. Further, the tracker 32D is fitted to the glove device 60 to notify the position of a hand of the operator and notify the movement of the hand.

The space drawing information generating device 40 is formed by a personal computer, for example, and processing thereof is performed by a program for space drawing information generation. The space drawing information generating device 40 performs switching processing so as to handle a coordinate value of a position indicated by the electronic pen 10 seamlessly when the position indicated by the electronic pen 10 moves from the position detection region DT of the digitizer 20 to the movement detection target spatial region MD of the spatial position detecting device 30 or when the position indicated by the electronic pen 10 moves from the movement detection target spatial region MD to the position detection region DT. In addition, processing of transforming the coordinate value of the position indicated by the electronic pen 10 may be performed along with the switching. An outline of main processing functions in the space drawing information generating device 40 will be described with reference to FIGS. 12A, 12B, and 12C.

Figure 12A:
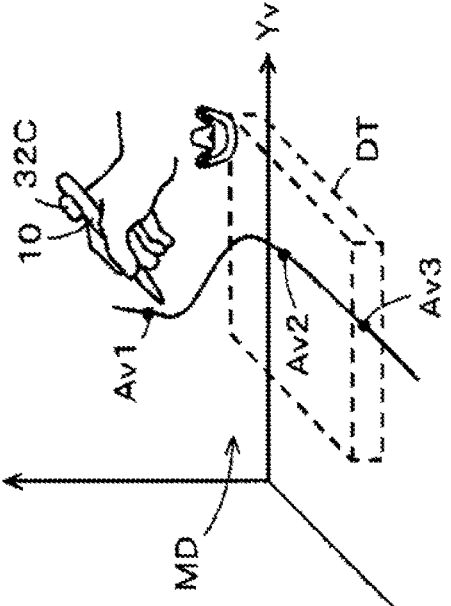
FIGS. 12A, 12B, and 12C are diagrams of assistance in explaining main operation of the second embodiment of the spatial position indication system according to the present disclosure.

FIG. 12A is a diagram illustratively illustrating a case where the position of the pen point of the electronic pen 10 moves from the movement detection target spatial region MD outside the position detection region DT of the digitizer 20 to the inside of the position detection region DT of the digitizer 20. The spatial position detecting device 30 detects the position of the pen point of the electronic pen 10 as position coordinates Av1, Av2, Av3, . . . , AvN in a three-dimensional coordinate space (Xv, Yv, Zv) of the spatial position detecting device 30, and supplies the position coordinates to the space drawing information generating device 40.

Figure 12B:
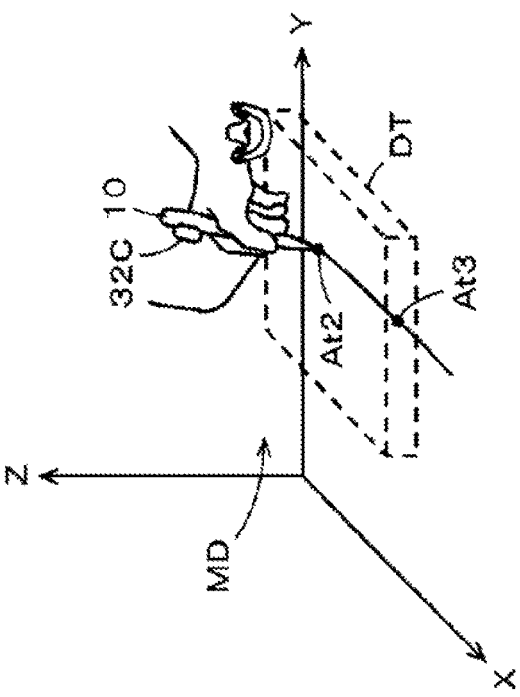

As for the positions Av2 and Av3 at which the position of the pen point of the electronic pen 10 is present within the position detection region DT of the digitizer 20, the digitizer 20 also detects the pen point position of the electronic pen 10 as position coordinates At2, At3, . . . in a three-dimensional coordinate space (X, Y, Z) of the digitizer 20 as illustrated in FIG. 12B, and supplies the position coordinates to the space drawing information generating device 40.

Figure 12C:
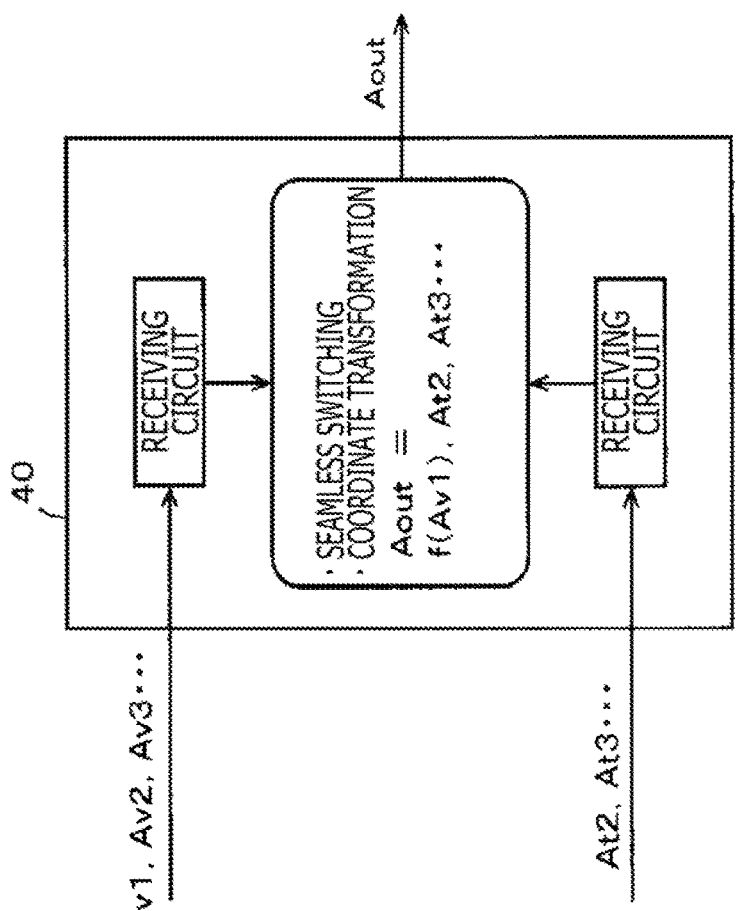

As illustrated in FIG. 12C, the space drawing information generating device 40 outputs position information Aout of the pen point of the electronic pen 10 by switching from the position information detected by the spatial position detecting device 30 to the position information detected by the digitizer 20 when the pen point position of the electronic pen 10 comes into the position detection region DT of the digitizer 20.

The space drawing information generating device 40 in the present example changes the position coordinates Av1, AV2, Av3, . . . of the pen point of the electronic pen 10 which position coordinates are detected by the spatial position detecting device 30 into coordinates f(Av1), f(AV2), f(Av3), f(AvN) (f denotes mapping from the movement detection target spatial region MD to the position detection region DT) transformed so as to be able to be handled in common by the digitizer 20 as in the first embodiment described above.

Here, the processing of coordinate transformation between the space coordinate system of the position detection region DT of the digitizer 20 and the space coordinate system of the movement detection spatial region MD can be performed by using offset values in which a difference between the origin positions of the two space coordinate systems is taken into consideration when the respective directions of an Xv-axis, a Yv-axis, and a Zv-axis are same directions as the respective directions of an X-axis, a Y-axis, and a Z-axis as in the foregoing. In addition, in a case where the respective directions of the X-axis, the Y-axis, and the Z-axis are different from the respective directions of the Xv-axis, the Yv-axis, and the Zv-axis, the coordinate transformation can be performed by performing linear transformation using, for example, the determinant illustrated in Equation 1 or the like as in the foregoing first embodiment.

In the case of FIGS. 12A, 12B, and 12C, f(Av1), f(AV2), f(Av3), . . . , f(AvN) can be used as the position information output Aout of the pen point of the electronic pen 10 in the space drawing information generating device 40 when the pen point of the electronic pen 10 moves. At the position coordinates Av2 and Av3, it suffices to use the position information detected by the digitizer 20, and the position coordinates Av2 and Av3 are At2 and At3, respectively.

Hence, the position information output Aout of the pen point of the electronic pen 10 is expressed as $$A_{out} = f(Av1), At2, At3, \ldots$$

Hence, the space drawing information generating device 40 can seamlessly handle the pen point position of the electronic pen 10 even in a case where the movement trajectory of the pen point of the electronic pen 10 straddles the inside of the position detection region DT in which the digitizer 20 can detect the pen point position of the electronic pen 10 and a region on the outside of the position detection region DT in which region only the spatial position detecting device 30 can detect the pen point position.

Figure 13:
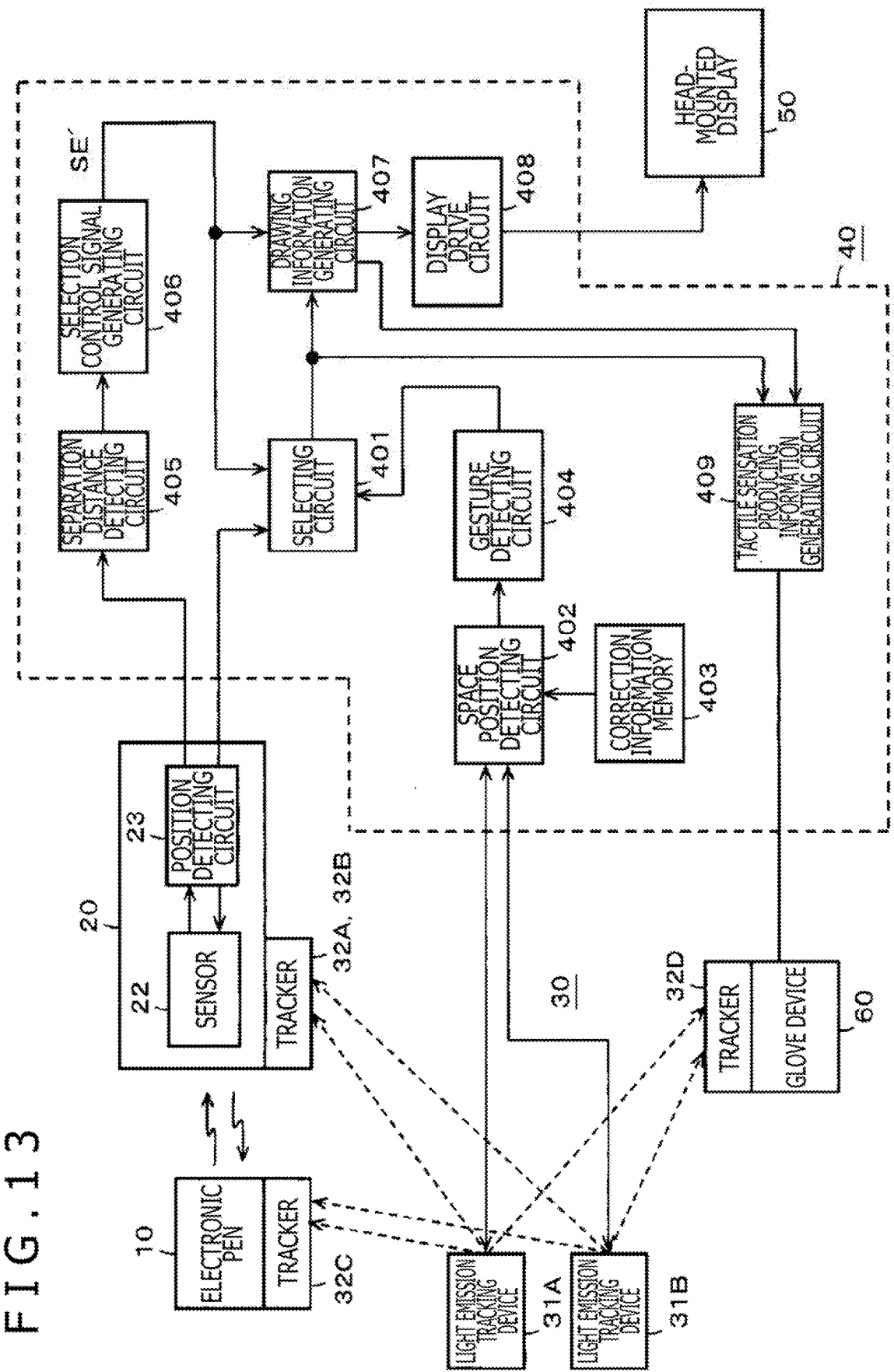
FIG. 13 is a block diagram of assistance in explaining an example of a configuration of the second embodiment of the spatial position indication system according to the present disclosure.

FIG. 13 illustrates an example of a configuration in which processing functions performed by the space drawing information generating device 40 in the second embodiment are illustrated as a configuration of functional blocks. Incidentally, in FIG. 13, each functional block is referred to as a "circuit" for convenience.

In the space drawing information generating device 40, detection output of the position indicated by the electronic pen 10 from the position detecting circuit 23 of the digitizer 20 is supplied as one input of a selecting circuit 401 to the selecting circuit 401.

The space position information of each of the trackers 32A to 32D from the two light emission tracking devices 31A and 31B of the spatial position detecting device 30 is supplied to a spatial position detecting circuit 402 of the space drawing information generating device 40. In addition, though not illustrated, as described earlier, the reception output of the light receiving sensors and the output of the 9-axis sensor from each of the trackers 32A, 32B, 32C, and 32D are also supplied to the spatial position detecting circuit 402. The spatial position detecting circuit 402 detects also directions in which the trackers 32A, 32B, 32C, and 32D are oriented from these pieces of information. The tracker 32C is attached to the electronic pen 10 in a state in which the tracker 32C is in specific directional relation and positional relation to the pen point position. Thus, the spatial position detecting circuit 402 detects the pen point position of the electronic pen 10 from the position and direction of the detected tracker 32C.

The spatial position detecting circuit 402 sets a spatial region on three coordinate axes (set as Xs, Ys, and Zs for convenience also in the present example), that is, the movement detection target spatial region MDv as a spatial region in which the spatial position detecting device 30 can detect the positions of the trackers 32A to 32D. The spatial position detecting circuit 402 detects the spatial position coordinates of the digitizer 20, the electronic pen 10, and the glove device 60 on the three axes Xs, Ys, and Zs from the space position information of each of the trackers 32A to 32D from the two light emission tracking devices 31A and 31B.

Hence, in the spatial position indication system according to the second embodiment, the whole of the position detection region DT' of the digitizer 20 is included within the movement detection target spatial region MDv of the spatial position detecting device 30. In the present embodiment, the digitizer 20 is installed within the movement detection target spatial region MDv with the position of the digitizer 20 fixed within the movement detection target spatial region MDv. That is, the position detection region DT' of the digitizer 20 is included as a fixed region within the movement detection target spatial region MDv in the spatial position detecting circuit 402. That is, the movement detection target spatial region MDv of the spatial position detecting circuit 402 includes the position detection region DT' of the digitizer 20 as a common region.

Supposing that the attachment positions of the tracker 32A and 32B attached to the digitizer 20 are accurate, it suffices to adjust an origin position offset between the coordinate system (X, Y, Z) of the position detection region DT of the digitizer 20 and the coordinate system (Xs, Ys, Zs) of the movement detection spatial region MD' of the spatial position detecting circuit 402.

However, in the present embodiment, in consideration of a fear of occurrence of an error in accuracy between the coordinate system (X, Y, Z) of the position detection region DT' of the digitizer 20 and the coordinate system (Xs, Ys, Zs) of the movement detection target spatial region MDv of the spatial position detecting circuit 402, the spatial position detecting circuit 402 has functions of the spatial position coordinate correcting circuit 206 described in the first embodiment. Then, also in the second embodiment, a correction information memory 403 is provided which stores the elements $a_{11}$ to $a_{33}$ of the determinant illustrated in FIG. 5, the elements being obtained as in the correction information memory 207 in the first embodiment.

The spatial position detecting circuit 402 calculates the determinant of (Equation 1) using the elements $a_{11}$ to $a_{33}$ of the determinant from the correction information memory 403, and supplies the spatial position coordinate output of the trackers 32A to 32D to a gesture detecting circuit 404.

The gesture detecting circuit 404 detects the movement (gesture) of the electronic pen 10 and the movement of the glove device 60 based on the coordinate output from the spatial position detecting circuit 402, and supplies a resulting detection output as another input signal of the selecting circuit 401.

In the second embodiment, as in the first embodiment, the position detecting circuit 23 of the digitizer 20 supplies information regarding the signal level of a signal received from the electronic pen 10 to a separation distance detecting circuit 405 of the space drawing information generating device 40. The separation distance detecting circuit 405 detects a separation distance of the pen point of the electronic pen 10 from the input surface 21S of the digitizer 20 from the signal level of the signal received from the electronic pen 10. The separation distance detecting circuit 405 then supplies information regarding the detected separation distance to a selection control signal generating circuit 406.

The selection control signal generating circuit 406 generates a selection control signal SE' that controls the selecting circuit 401 so as to select the detection output of the position detecting circuit 23 of the digitizer 20 when the separation distance of the pen point of the electronic pen 10 from the input surface 21S of the digitizer 20 is equal to or smaller than the distance Lz at which the above-described hovering state can be detected, and controls the selecting circuit 401 so as to select the detection output of the gesture detecting circuit 404 when the separation distance of the pen point of the electronic pen 10 from the input surface 21S of the digitizer 20 is larger than the distance Lz. The selection control signal generating circuit 406 controls the selecting circuit 401 by the generated switching control signal SE'. The selection control signal generating circuit 406 supplies the switching control signal SE' also to a drawing information generating circuit 407.

The selecting circuit 401 selects either the one input or the other input according to the selection control signal SW', and supplies the input to the drawing information generating circuit 407.

The drawing information generating circuit 407 generates drawing information corresponding to operation of the electronic pen 10 for drawing by the operator of the electronic pen 10 within the movement detection target spatial region MDv. In the second embodiment, the operation of the electronic pen 10 for drawing by the operator of the electronic pen 10 includes an operation of positioning the electronic pen 10 within the position detection region DT' of the digitizer 20 and performing indicated position input by the electronic pen 10 and an operation of positioning the electronic pen 1 outside the position detection region DT' of the digitizer 20 within the movement detection target spatial region MDv and making a gesture for drawing by moving the electronic pen 1.

When the electronic pen 10 is positioned within the position detection region DT' of the digitizer 20, the separation distance detecting circuit 405 detects that the electronic pen 10 is positioned within the position detection region DT' of the digitizer 20. Based on a resulting detection output, the selection control signal generating circuit 406 generates the selection control signal SE' that controls the selecting circuit 401 so as to select the detection output of the position detecting circuit 23 of the digitizer 20. Hence, the detection output of the position indicated by the electronic pen 10 from the position detecting circuit 23 of the digitizer 20 is supplied to the drawing information generating circuit 407 through the selecting circuit 401.

The drawing information generating circuit 407 performs drawing processing using, as line drawing input, the received detection output of the position indicated by the electronic pen 10, and generates a fine 3D drawing image.

In addition, when the electronic pen 1 is positioned outside the position detection region DT' of the digitizer 20 within the movement detection target spatial region MDv, the separation distance detecting circuit 405 detects that the electronic pen 1 is positioned outside the position detection region DT' of the digitizer 20 within the movement detection target spatial region MDv. Based on a resulting detection output, the switching signal generating circuit 406 generates the selection control signal SE' that controls the selecting circuit 401 so as to select the detection output of the gesture detecting circuit 404. Hence, gesture information based on the movement detection output of the electronic pen 10 and the glove device 60 from the gesture detecting circuit 404 is supplied to the drawing information generating circuit 407 through the selecting circuit 401.

The drawing information generating circuit 407 performs 3D drawing processing based on the received gesture information. That is, the drawing processing is performed according to the movement of the electronic pen 10 and the movement of the glove device 60 worn by the operator, the movement of the electronic pen 10 and the movement of the glove device 60 being detected by the gesture detecting circuit 404.

In this case, the drawing information generating circuit 407 determines whether to perform drawing processing using the detection output of the position indicated by the electronic pen 10 as line drawing input or whether to perform drawing processing based on the gesture information according to the selection control signal SE' of the selecting circuit 401.

Drawing image information generated by the drawing information generating circuit 407 as described above is supplied to the HMD 50 through a display drive circuit 408, and is displayed as a virtual image on a display image formed by an LCD, for example.

Hence, a remarkable effect is produced in that the operator can seamlessly perform drawing by a gesture from fine drawing merely by spatially moving the electronic pen 10 without being aware of switching between position detection in the digitizer 20 and position detection (movement detection) in the spatial position detecting device 30.

In this case, in the second embodiment, the drawing information generating circuit 407 includes a device that generates a virtual space image to be displayed on the HMD 50, and is able to draw a drawing image by the operator of the electronic pen 10 on the virtual space image. The position of a virtual object included in the virtual space image can be determined in advance within the movement detection target spatial region MDv. When the operator performs an operation of touching the virtual object included in the virtual space image by the glove device 60, the drawing information generating circuit 407 can detect the operation based on the gesture information from the gesture detecting circuit 404. When the operator performs the operation of touching the virtual object included in the virtual space image by the glove device 60, the drawing information generating circuit 407 outputs a resulting detection output to a tactile sensation producing information generating circuit 409.

When the tactile sensation producing information generating circuit 409 receives the detection output of the operation of touching the virtual object included in the virtual space image by the operator from the drawing information generating circuit 407, the tactile sensation producing information generating circuit 409 supplies the glove device 60 with tactile sensation producing information that produces a tactile sensation. The glove device 60 includes a tactile sensation producing device that performs vibration or the like based on the tactile sensation producing information. The tactile sensation producing device is driven to notify the operator that the virtual object is virtually touched.

Incidentally, the drawing information generating circuit 407 generates the drawing image information to be output so as to display, on the display screen of the HMD 50, a state in which the digitizer 20 is detecting the position indicated by the electronic pen 10 or in a state in which the spatial position detecting device 30 is detecting the spatial position of the electronic pen 10 according to the separation distance of the electronic pen 10 from the input surface 21S of the digitizer 20. Hence, the operator of the electronic pen 1 can accurately grasp which drawing operation to perform at the spatial position of the electronic pen 10 at a present time.

Incidentally, the foregoing modifications of the first embodiment are applicable also in the second embodiment. It is needless to say that in the second embodiment, the second modification uses the spatial position detecting device 30 and the spatial position detecting circuit 402 in place of the spatial position detecting device 204.

Modifications of Second Embodiment

In the foregoing second embodiment, the spatial position detecting device 30 has a configuration including the light emission tracking devices emitting infrared laser light and the trackers. However, it is needless to say that the spatial position detecting device 30 is not limited to this configuration. For example, a configuration using another invisible light sensor, a visible light sensor, or a combination thereof may also be adopted. In addition, the spatial position detecting device 30 may be configured to raise the critical height position by increasing the frequency of an electromagnetic wave emitted from the digitizer 203, and detect the spatial position of the electronic pen 1. That is, it suffices for the spatial position detecting device 30 to normally detect the position of the electronic pen 1 in the input surface of the digitizer 203 and the hover region at a first frequency, and switch to a second frequency higher than the first frequency and detect the spatial position of the electronic pen 1 at a second critical height position higher than a first critical height position at the first frequency.

In addition, a configuration may be adopted in which the electronic pen is provided with a battery and provided with radio wave transmitting and receiving means, a radio wave is externally transmitted to the electronic pen, and the spatial position of the electronic pen is used by receiving a radio wave from the electronic pen. In addition, a configuration using magnetic resonance, radio waves, or ultrasonic waves, or the like may be adopted. In addition, target objects whose spatial positions are to be detected (the electronic pen and the tablet) may be photographed by one or a plurality of cameras, and the spatial positions of the target objects may be detected by using the photographed images.

Incidentally, in the foregoing second embodiment, the operator of the electronic pen 10 wears the HMD 50, and therefore cannot directly see the digitizer 20. Accordingly, a virtual image of the digitizer 20 can be drawn in the virtual space image displayed on the HMD 50 so that the operator recognizes the position of the digitizer 20 on the display screen of the HMD 50. In addition, the HMD may of course support augmented reality (AR), so that the digitizer 20 can be seen directly. In addition, while the glove device 60 and the electronic pen 10 are configured separately from each other, the glove device 60 and the electronic pen 10 may be combined with each other.

In addition, the means for displaying a three-dimensional image is not limited to the HMD, but may use glasses (spectacles), a 3D display, contact lenses, an aerial imaging (AI) plate, and further a hologram technology or the like. In addition, the digitizer 20 may be provided with a display such for example as an LCD or the like, and 3D display may be made on the display. These display means may be used together with the HMD so that a person other than the wearer of the HMD views a drawing image displayed on the HMD.

Incidentally, as for coordinate transformation, in the second embodiment, the coordinate value of the pen point of the electronic pen which coordinate value is detected by the spatial position detecting device 30 is transformed into a coordinate value in the coordinate system in the digitizer 20. Conversely, however, the coordinate value of the pen point of the electronic pen which coordinate value is detected by the digitizer 20 may be transformed into a coordinate value in the coordinate system in the spatial position detecting device 30.

In addition, in the foregoing example, the separation distance of the pen point position of the electronic pen 10 from the input surface of the digitizer 20 is detected based on the reception level of the signal between the sensor 22 of the digitizer 20 and the electronic pen 10. However, the method of detecting the separation distance between the pen point position of the electronic pen 10 and the input surface of the digitizer 20 is not limited to this.

For example, in the second embodiment, the spatial position detecting device 30 can detect the pen point position of the electronic pen and the position of the input surface of the digitizer 20. Thus, the separation distance between the pen point position of the electronic pen 10 and the input surface of the digitizer 20 may be detected from the detected pen point position of the electronic pen 10 and the detected position of the input surface of the digitizer 20, and the selection control signal of the selecting circuit 401 may be generated.

Other Embodiments or Modifications

Incidentally, in the description of the foregoing embodiments, a gesture based on the movement of the electronic pen is detected in the spatial region outside the position detection region DT or DT' of the digitizer as an example of the indicated position detecting device. However, the position indicated by the electronic pen based on the movement of the pen point of the electronic pen, rather than the movement of the electronic pen, can be detected also in the outside spatial region.

Incidentally, in the foregoing embodiment, when the position of the electronic pen moves from the inside of the position detection region DT or DT' of the digitizer as an example of the indicated position detecting device to the spatial region outside the position detection region DT or DT', the drawing processing circuit 212 and the drawing information generating circuit 407 immediately perform drawing processing according to a gesture based on movement detection in the movement detection spatial region MD or the movement detection target spatial region MDv. However, the operator does not necessarily move the electronic pen from the inside of the position detection region DT or DT' of the digitizer to the spatial region outside the position detection region DT or DT' in order to make a gesture for drawing, but may thus move the electronic pen simply to stop drawing operation input.

In consideration of this, the drawing processing circuit 212 and the drawing information generating circuit 407 can also be configured to perform drawing processing according to a gesture based on movement detection in the movement detection spatial region MD or the movement detection target spatial region MDv when the position of the electronic pen moves from the inside of the position detection region DT or DT' of the digitizer as an example of the indicated position detecting device to the spatial region outside the position detection region DT or DT', and when a further predetermined trigger event is detected.

Incidentally, in that case, the selecting circuit 205 and the selecting circuit 401 may be selection-controlled when the position of the electronic pen moves from the inside of the position detection region DT or DT' of the digitizer as an example of the indicated position detecting device to the spatial region outside the position detection region DT or DT', or may be selection-controlled when the further trigger event is detected. Incidentally, the position of the electronic pen 1 is of course detected immediately by the digitizer 203 and the digitizer 20 when the position of the electronic pen moves to the inside of the position detection region DT or DT' of the digitizer as an example of the indicated position detecting device from the spatial region outside the position detection region DT or DT'.

Specifically, for example, the drawing processing circuit 212 and the drawing information generating circuit 407 are configured to perform drawing processing according to a gesture based on movement detection in the movement detection spatial region MD or the movement detection target spatial region MDv only when the operator moves the position of the electronic pen from the inside of the position detection region DT or DT' of the digitizer as an example of the indicated position detecting device to the spatial region outside the position detection region DT or DT', and the operator further operates the side switch mounted on the electronic pen as the predetermined trigger event.

The predetermined trigger event is not limited to the operation of the side switch. For example, the predetermined trigger event may be a specific gesture of the operator of the electronic pen. Alternatively, the predetermined trigger event may be a voice instruction of the operator. In a case where a voice instruction is set as the predetermined trigger event, a microphone is provided to the tablet device 2 in the first embodiment, and a microphone is provided to the space drawing information generating device in the second embodiment. A voice collected by the microphone is subjected to voice recognition, and whether the voice is the specific trigger event of the operator is determined. Alternatively, a microphone may be provided to the electronic pen, and collected voice information may be sent out through the wireless communicating included in the electronic pen, received by the wireless communicating included in the tablet device 2 or the space drawing information generating device, and subjected to voice recognition.

In the foregoing first embodiment and the foregoing second embodiment, an electronic pen and a digitizer of an electromagnetic induction type are used. However, the electronic pen and the digitizer are not limited to this, but an electronic pen and a digitizer of a capacitive type (including an active capacitive coupling type and a passive capacitive coupling type) can of course be used.

In addition, the tablet device 2 according to the first embodiment and the digitizer according to the second embodiment may be a portable mobile telephone terminal referred to as what is called a smart phone, and may be a personal computer provided with a digitizer.

Incidentally, the above description has been made of a case where 3D drawing is performed by the spatial position indication system. However, drawing images as a target of the present disclosure may be 2D drawing images and 2.5D drawing images.

Description of Reference Symbols

1, 1A, 1C, 10 . . . Electronic pen, 2 . . . Tablet device, 20 . . . Digitizer, 30 . . . Spatial position detecting device, 40 . . . Space drawing information generating device, 50 . . . Head-mounted display, 201 . . . LCD, 202 . . . Casing of the tablet device 2, 203 . . . Digitizer, 204 . . . Spatial position detecting device, 205, 401 . . . Selecting circuit, 206 . . . Spatial position coordinate correcting circuit, 207 . . . Correction information memory, 208, 404 . . . Gesture detecting circuit, 210, 405 . . . Separation distance detecting circuit, 211, 406 . . . Selection control signal generating circuit, 213 . . . Drawing processing circuit, 407 . . . Drawing information generating circuit

The invention claimed is:

1. A spatial position indication system comprising:
an indicated position detecting circuit which, in operation, detects a first position in a hover region over an input surface that receives instruction input by an electronic pen, the first position in the hover region being a position of the electronic pen in the hover region over the input surface that receives instruction input by the electronic pen, the indicated position detecting circuit detecting the first position in the hover region while the electronic pen is in a hovering state in which the electronic pen is not in contact with the input surface that receives instruction input by the electronic pen;
a spatial position detecting circuit which, in operation, detects a second position in a spatial region including at least part of the hover region over the input surface that receives instruction input by the electronic pen, the second position in the spatial region being a position of the electronic pen in the spatial region including at least part of the hover region over the input surface; and
circuitry which, in operation, (1) generates a first coordinate corresponding to the first position in the hover region, the first coordinate being in a first three-dimensional coordinate system, (2) generates a second coordinate corresponding to the second position in the spatial region, the second coordinate being in a second three-dimensional coordinate system, an origin of the second three-dimensional coordinate system being different from an origin of the first three-dimensional coordinate system, and (3) transforms the first coordinate in the first three-dimensional coordinate system into a third coordinate in the second three-dimensional coordinate system.

2. The spatial position indication system according to claim 1, wherein
the circuitry, in operation, selects whether to use the first position in the hover region as an instruction input or use the second position in the spatial region as the instruction input according to a separation distance of the electronic pen from the input surface.

3. The spatial position indication system according to claim 2, wherein
the circuitry, in operation, detects the separation distance based on the second position in the spatial region.

4. The spatial position indication system according to claim 2, wherein
the circuitry, in operation, detects the separation distance based on a level of a signal sent from the electronic pen and the second position in the spatial region.

5. The spatial position indication system according to claim 2, wherein
the circuitry, in operation, detects the separation distance based on a level of a signal sent by the electronic pen.

6. The spatial position indication system according to claim 2, wherein
the circuitry, in operation, visually indicates, on a display device, whether the indicated position detecting circuit is selected or whether the spatial position detecting circuit is selected.

7. The spatial position indication system according to claim 2, wherein
the circuitry, in operation, performs selection control as to whether to use the first position in the hover region as the instruction input or use the second position in the spatial region as the instruction input when a trigger event is detected.

8. The spatial position indication system according to claim 1, wherein
the circuitry, in operation, controls a drawing image displayed on a display device based on the first position in the hover region and the second position in the spatial region.

9. The spatial position indication system according to claim 8, wherein
the display device includes a head-mounted display.

10. The spatial position indication system according to claim 9, wherein
the circuitry, in operation, generates a drawing image as a virtual reality image, and the virtual reality image is displayed on the head-mounted display.

11. The spatial position indication system according to claim 1, wherein
the electronic pen includes:
a sensor which, in operation, detects a movement of the electronic pen, and
a transmitter which, in operation, transmits information regarding the movement of the electronic pen detected by the sensor.

12. The spatial position indication system according to claim 1, wherein
the spatial position detecting circuit detects the second position in the spatial region via a tracking detecting device attached to the electronic pen.

13. The spatial position indication system according to claim 1, wherein
the spatial position detecting circuit detects the second position in the spatial region via a tracking device attached to the indicated position detecting circuit.

14. The spatial position indication system according to claim 1, wherein
the indicated position detecting circuit, in operation, detects a second position while the electronic pen is in contact with the input surface that receives instruction input by the electronic pen, the second position being a position of the electronic pen while the electronic pen is in contact with the input surface that receives instruction input by the electronic pen.

15. A spatial position indication method comprising:
detecting, by an indicated position detecting circuit, a first position in a hover region over an input surface that receives instruction input by an electronic pen, the first position in the hover region being a position of the electronic pen in the hover region over the input surface that receives instruction input by the electronic pen, the indicated position detecting circuit detecting the first position in the hover region while the electronic pen is in a hovering state in which the electronic pen is not in contact with the input surface that receives instruction input by the electronic pen;
detecting, by a spatial position detecting circuit, a second position in a spatial region including at least part of the hover region over the input surface that receives instruction input by the electronic pen, the second position in the spatial region being a position of the electronic pen in the spatial region including at least part of the hover region over the input surface;
generating, by circuitry, a first coordinate corresponding to the first position in the hover region, the first coordinate being in a first three-dimensional coordinate system;
generating, by the circuitry, a second coordinate corresponding to the second position in the spatial region, the second coordinate being in a second three-dimensional coordinate system, an origin of the second three-dimensional coordinate system being different from an origin of the first three-dimensional coordinate system; and
transforming, by the circuitry, the first coordinate in the first three-dimensional coordinate system into a third coordinate in the second three-dimensional coordinate system.

16. The spatial position indication method according to claim 15, further comprising:
selecting, by the circuitry, whether to use the first position in the hover region as an instruction input or use the second position in the spatial region as the instruction input according to a separation distance of the electronic pen from the input surface.

17. The spatial position indication method according to claim 16, further comprising:
detecting, by the circuitry, the separation distance based on the second position in the spatial region.

18. The spatial position indication method according to claim 16, further comprising:
detecting, by the circuitry, the separation distance based on a level of a signal sent from the electronic pen and the second position in the spatial region.

19. The spatial position indication method according to claim 16, further comprising:

detecting, by the circuitry, the separation distance based on a level of a signal sent by the electronic pen.

20. The spatial position indication method according to claim 16, further comprising:
visually indicating on a display device, by the circuitry, whether the indicated position detecting circuit is selected or whether the spatial position detecting circuit is selected.

21. The spatial position indication method according to claim 16, further comprising:
performing, by the circuitry, selection control as to whether to use the first position in the hover region as the instruction input or use the second position in the spatial region as the instruction input when a trigger event is detected.

22. The spatial position indication method according to claim 15, further comprising:
controlling, by the circuitry, a drawing image displayed on a display device based on the first position in the hover region and the second position in the spatial region.

23. The spatial position indication method according to claim 22, wherein:
the display device includes a head-mounted display.

24. The spatial position indication method according to claim 23, further comprising:
generating, by the circuitry, a drawing image as a virtual reality image that is displayed on the head-mounted display.

25. The spatial position indication method according to claim 15, further comprising:
detecting, by a sensor of the electronic pen, a movement of the electronic pen; and
transmitting, by the electronic pen, information regarding the movement of the electronic pen detected by the sensor of the electronic pen.

26. The spatial position indication method according to claim 15, wherein:
the detecting, by the spatial position detecting circuit, includes detecting the second position in the spatial region via a tracking detecting device attached to the electronic pen.

27. The spatial position indication method according to claim 15, wherein:
the detecting, by the spatial position detecting circuit, includes detecting the second position in the spatial region via a tracking device attached to the indicated position detecting circuit.

28. The spatial position indication method according to claim 15, wherein:
detecting, by the indicated position detecting circuit, a second position while the electronic pen is in contact with the input surface that receives instruction input by the electronic pen, the second position being a position of the electronic pen while the electronic pen is in contact with the input surface that receives instruction input by the electronic pen.

* * * * *